(12) United States Patent
Prados et al.

(10) Patent No.: US 11,668,815 B2
(45) Date of Patent: Jun. 6, 2023

(54) SYSTEMS AND METHODS FOR DETECTING OBJECTS

(71) Applicant: ZENDAR INC., Berkeley, CA (US)

(72) Inventors: Michael Prados, Berkeley, CA (US); Antonio Puglielli, Berkeley, CA (US); Darsh Ranjan, Berkeley, CA (US); Christopher Hanks, Berkeley, CA (US); Man Chung Chim, Berkeley, CA (US); Vinayak Nagpal, Berkeley, CA (US); Ching Ming Wang, Berkeley, CA (US)

(73) Assignee: Zendar Inc., Berkeley, CA (US)

( * ) Notice: Subject to any disclaimer, the term of this patent is extended or adjusted under 35 U.S.C. 154(b) by 96 days.

(21) Appl. No.: 16/451,255

(22) Filed: Jun. 25, 2019

(65) Prior Publication Data
US 2020/0174115 A1   Jun. 4, 2020

Related U.S. Application Data

(63) Continuation of application No. 16/192,725, filed on Nov. 15, 2018, now Pat. No. 10,365,364.
(Continued)

(51) Int. Cl.
*G01S 13/931* (2020.01)
*G01S 13/86* (2006.01)
*G01S 7/28* (2006.01)

(52) U.S. Cl.
CPC .............. *G01S 13/931* (2013.01); *G01S 7/28* (2013.01); *G01S 13/865* (2013.01);
(Continued)

(58) Field of Classification Search
CPC .... G01S 13/931; G01S 13/865; G01S 13/867; G01S 7/28; G01S 2013/93247; G01S 2013/93271; G01S 2013/93272
See application file for complete search history.

(56) References Cited

U.S. PATENT DOCUMENTS 4,717,916 A   1/1988  Adams et al.
5,117,238 A   5/1992  Silverstein et al.
(Continued)

FOREIGN PATENT DOCUMENTS

CN   104793202 A   7/2015
CN   107870327 A   4/2018
WO   WO-2019222589 A1   11/2019

OTHER PUBLICATIONS

Capano. Antenna basics, antenna types, antenna functions, Control Engineering Website. Aug. 2, 2014. Available at website: https://www.controleng.com/articles/antenna-basics-antenna-types-antenna-functions/. Accessed on Nov. 27, 2018.
(Continued)

*Primary Examiner* — Marcus E Windrich
(74) *Attorney, Agent, or Firm* — Michael Best & Friedrich LLP

(57) ABSTRACT

A method for radar imaging is disclosed herein. The method may comprise using a plurality of radar antenna arrays provided on a terrestrial vehicle to obtain phase measurements associated with one or more radar signals transmitted and received by the plurality of radar antenna arrays as the terrestrial vehicle moves through an environment. The method may further comprise processing the phase measurements to compute (i) a set of object-specific properties for one or more objects external to the terrestrial vehicle and (ii) a set of vehicle-specific properties for the terrestrial vehicle. The method may further comprise using the set of object-specific properties and the set of vehicle-specific properties to generate one or more radar images of the environment as the terrestrial vehicle moves through the environment.

22 Claims, 15 Drawing Sheets

Related U.S. Application Data

(60) Provisional application No. 62/673,622, filed on May 18, 2018.

(52) U.S. Cl.
CPC ... *G01S 13/867* (2013.01); *G01S 2013/93271* (2020.01); *G01S 2013/93272* (2020.01); *G01S 2013/93274* (2020.01)

(56) References Cited

U.S. PATENT DOCUMENTS

| | | | |
|---|---|---|---|
| 5,144,322 | A | 9/1992 | Gabriel |
| 6,411,250 | B1 | 6/2002 | Oswald et al. |
| 6,496,158 | B1 | 12/2002 | Ksienski et al. |
| 8,049,660 | B2 | 11/2011 | Mizutani et al. |
| 8,941,533 | B2 | 1/2015 | Mizutani et al. |
| 9,791,551 | B1 | 10/2017 | Eshraghi et al. |
| 9,819,083 | B1 | 11/2017 | Chen et al. |
| 10,048,366 | B1 | 8/2018 | Hong et al. |
| 10,082,570 | B1 | 9/2018 | Izadian et al. |
| 10,365,364 | B1 | 7/2019 | Prados et al. |
| 2004/0104844 | A1 | 6/2004 | Rooyen et al. |
| 2005/0195103 | A1 | 9/2005 | Davis et al. |
| 2006/0114155 | A1 | 6/2006 | Numminen |
| 2007/0021915 | A1 | 1/2007 | Breed et al. |
| 2011/0169946 | A1* | 7/2011 | Rudin ............... G01S 5/16 348/135 |
| 2011/0285577 | A1* | 11/2011 | Sun ............... G01S 13/36 342/21 |
| 2014/0306840 | A1 | 10/2014 | Koerber et al. |
| 2015/0198711 | A1* | 7/2015 | Zeng ............... G01S 13/9029 342/59 |
| 2015/0316386 | A1* | 11/2015 | Delp ............... B60W 30/12 701/532 |
| 2018/0088224 | A1* | 3/2018 | Kishigami ............... H01Q 21/06 |
| 2018/0203108 | A1* | 7/2018 | Nedjar ............... G01S 13/931 |
| 2019/0128998 | A1* | 5/2019 | Josefsberg ............... G01S 13/867 |
| 2021/0080537 | A1* | 3/2021 | Melzer ............... G01S 13/584 |

OTHER PUBLICATIONS

PCT/US2019/032813 International Search Report and Written Opinion dated Jul. 1, 2019.
Radar Basics. Range resolution. Available at http://www.radartutorial.eu/01.basics/Range%20Resolution.en.html. Accessed on Nov. 27, 2018.
Radartutorial. Radar Basics Book 1. Available at http://www.radartutorial.eu. Dec. 20, 2009 revision.
Reference designer Webpage. Common Clock Vs Source Synchronous Clock Scheme. Available at http://referencedesigner.com/books/si/common-vs-source-sync.php. Accessed on Nov. 27, 2018.
Synthetic-Aperture Radar (SAR) Basics. Available at https://people.eecs.ku.edu/~callen58/826/EECS826.htm. Accessed on Nov. 27, 2018.
Techopedia. real-time-clock-RTC webpage. Available at https://www.techopedia.com/definition/2273/real-time-clock-rtc. Accessed on Nov. 27, 2018.
U.S. Appl. No. 16/192,725 Notice of Allowance dated Jun. 12, 2019.
U.S. Appl. No. 16/192,725 Office Action dated Jan. 31, 2019.
Wikipedia website. Bandwidth-signal processing. Available at https://en.wikipedia.org/wiki/Bandwidth_(signal_processing). Accessed on Nov. 27, 2018.
Wikipedia website. Real-time-clock. Available at https://en.wikipedia.org/wiki/Real-time_clock. Accessed on Nov. 27, 2018.
Wikipedia website. Synthetic-aperture radar. Available at https://en.wikipedia.org/wiki/Synthetic-aperture_radar. Accessed on Nov. 27, 2018.
Ressler M. The Army Research Laboratory (ARL) synchronous impulse reconstruction (SIRE) forward-looking radar, Proceedings of SPIE, vol. 6561, Apr. 27, 2007, p. 656105, XP055878257.
Nguyen, L. Augmented reality using ultra-wideband radar imagery, Proceedings SPIE, vol. 8021, Jun. 21, 2011, p. 802104, XP040560513.
Feger R. Experimental verification of a 77-GHz synthetic aperture radar system for automotive applications, 2017 IEEE MTT-S International Conference on Microwaves for Intelligent Mobility, Mar. 19, 2017, pp. 111-114 XP033092032.
DE 10 2010 048896 Al (Volkswagen AG [DE]) Apr. 19, 2012 (Apr. 19, 2012) * paragraph [0047].
Nguyen L. Signal processing techniques for the U.S. Army Research Laboratory stepped frequency ultra-wideband radar. Proceedings of SPIE; [Proceedings of SPIE ISSN 0277-786X vol. 10524], SPIE, US, vol. 10188, May 1, 2017 (May 1, 2017), pp. 101880J-101880J XP060089043.
Giorgio F. FLoSAR: a new concept for Synthetic Aperture Radar. Radar Conference, 2008. RADAR '08. IEEE, IEEE, Piscataway, NJ, USA, May 26, 2008 (May 26, 2008), pp. 1-4, XP031376068.
Summer A. 3D multiple input single output near field automotive synthetic aperture radar. 2017 18th International Radar Symposium (IRS), German Institute of Navigation—Dgon, Jun. 28, 2017 (Jun. 28, 2017), pp. 1-10, XP033142240.

* cited by examiner

SYSTEMS AND METHODS FOR DETECTING OBJECTS

CROSS-REFERENCE TO RELATED APPLICATION

This application is a continuation of U.S. patent application Ser. No. 16/192,725 filed on Nov. 15, 2018, which claims priority to U.S. Provisional Patent Application No. 62/673,622 filed May 18, 2018, which application is incorporated herein by reference in its entirety for all purposes.

BACKGROUND

RAdio Detection And Ranging (radar) can be used in many applications including object detection, range-finding, direction-finding and mapping. Traditionally, radar has been used in aerial vehicles, satellites, and maritime vessels to locate objects and image terrain. In recent years, radar is finding increasing use in automobiles for applications such as blind-spot detection, collision avoidance, and autonomous driving. Unlike optical-based sensors (such as cameras or Light Detection and Ranging (LIDAR) systems) which are affected by changing weather and visibility, radar is capable of functioning in low light conditions, in the dark, and under all types of weather conditions.

However, existing automotive radar technology may lack the required resolution to (1) sense different objects, (2) distinguish between closely spaced objects, or (3) detect characteristics of objects on the road or in the surrounding environment. The resolution of existing automotive radar systems may be limited in both azimuth and elevation. Additionally, existing automotive radar systems tend to have a limited number of antenna channels and limited aperture size due to constraints imposed by automotive vehicle body size.

Although radar technology used in aerial vehicles and satellites may have higher resolution, such systems often require additional components and sensors that are cost prohibitive for commercial automotive use, due to different operational wavelengths between aerial/space applications versus automotive applications. Furthermore, the radar technology used in aerial vehicles and satellites may not be easily adaptable for automotive vehicles, given that the intended modes of operation between aerial/space and terrestrial applications are typically very different.

SUMMARY

With recent emphasis on autonomous driving, there is a need for long range detection sensors on automotive vehicles that can provide advance notice to drivers about potential obstacles or dangers on the roads. However, existing automotive radar technology may not be ready and suitable for deployment in long range detection sensors on automotive vehicles, in view of at least the challenges described above.

A need exists for a high resolution radar system on a terrestrial vehicle that can be used to accurately detect targets and/or characteristics of the targets as the terrestrial vehicle is moving through an environment.

The present disclosure provides methods and systems for detecting objects in proximity to a vehicle, along or in proximity to a travel path of a vehicle, and/or in a field of view of the vehicle. The vehicle may be a terrestrial vehicle (e.g., a car or a bus).

A high resolution radar system as disclosed herein can be a radar system capable of distinguishing between multiple targets that are very close to one another in either range and/or bearing, with respect to the radar system. The radar system may achieve higher resolution by improving range resolution, azimuth resolution, elevation resolution, or any combination thereof. Range resolution is the ability of a radar system to distinguish between two or more targets on the same bearing but at different ranges. Azimuth resolution is the ability of a radar system to distinguish between objects at similar range but different bearings. Elevation resolution is the ability of a radar system to distinguish between objects at similar range but different elevation. Range resolution may be a function of bandwidth, while azimuth and elevation resolution may be a function of radar array geometry. The radar system can accurately detect targets and/or characteristics of targets if it can sense the presence of one or more targets, distinguish one or more targets as separate targets, and/or determine some physical properties of one or more targets.

The radar system disclosed herein can be implemented using any radar antenna array (for example, millimeter wavelength radar antenna arrays that are relatively low cost, compact and readily commercially available). The radar system disclosed herein can also enable accurate measurement and tracking of vehicle position by using returns from the radar antenna array. In some cases, the radar system may be a Synthetic Aperture Radar (SAR) system that is adapted for use on terrestrial vehicles. Alternatively, the radar system may incorporate one or more elements of a SAR system. A SAR system as disclosed herein can provide high resolution radar imagery from a moving terrestrial platform or terrestrial vehicle. A SAR system may utilize accurate measurement and tracking of the terrestrial vehicle position to transform raw radar returns into focused images. To achieve reliable SAR imaging and accurate measurements of vehicle and/or target positions, the spatial configuration of the SAR system may be fixed or adjusted based on a wavelength of a radar signal or a fraction of a wavelength of a radar signal.

In an aspect, the present disclosure provides systems and methods for determining a spatial disposition or a characteristic of a target external to a terrestrial vehicle. The system may comprise a radar antenna array comprising (i) a transmitting antenna and (ii) a receiving antenna; a vehicle position sensor configured to obtain a spatial disposition of the terrestrial vehicle; and a controller operatively coupled to the radar antenna array and the vehicle position sensor. The controller may be configured to (a) synchronize (i) successive radar pulses transmitted by the transmitting antenna and a plurality of signals received by the receiving antenna, which plurality of signals may correspond to at least a subset of the successive radar pulses and may be generated upon the at least a subset of the successive radar pulses interacting with the target, with (ii) the spatial disposition of the terrestrial vehicle obtained by the vehicle position sensor substantially in real time as the terrestrial vehicle is in motion, to generate a set of synchronized measurements; and to (b) use the set of synchronized measurements to determine (i) the spatial disposition of the target relative to the terrestrial vehicle or (ii) the characteristic of the target.

In some embodiments, the transmitting antenna and the receiving antenna may have a fixed spatial configuration. The set of synchronized measurements may be generated based at least in part on the fixed spatial configuration. In some embodiments, the fixed spatial configuration may comprise a fixed distance between the transmitting antenna and the receiving antenna such that the transmitting antenna and the receiving antenna are fixedly mounted relative to one another.

In some embodiments, the system may further comprise a plurality of antennas comprising the transmitting antenna or the receiving antenna. A distance between adjacent antennas of the plurality of antennas may be from about one-quarter to about ten times of a wavelength of a center frequency of the successive radar pulses. In some embodiments, the distance between the adjacent receiving antennas of the plurality of antennas may be about one-half of the wavelength of the center frequency of the successive radar pulses. In some embodiments, the controller may be configured to control the radar antenna array such that when the terrestrial vehicle is in motion, a pulse repetition frequency at which the successive radar pulses are transmitted may be greater than an inverse of a time duration that the terrestrial vehicle takes to travel a length approximately equal to the distance between the adjacent receiving antennas.

In some embodiments, the controller may be configured to control a pulse repetition frequency of the array to be approximately equal to an inverse of a time duration that the terrestrial vehicle may take to travel a fraction of the wavelength or multiples of a fraction of the wavelength.

In some embodiments, the radar antenna array may be configured to be mounted to a front side, rear side, or lateral side of the terrestrial vehicle.

In some embodiments, the system may further comprise a plurality of radar antenna arrays comprising the radar antenna array. The plurality of radar antenna arrays may be configured to be mounted to a same side of the terrestrial vehicle or to different sides of the terrestrial vehicle, in a same orientation or different orientations. The plurality of radar antenna arrays may be configured to provide multi-angle target sensing coverage around the terrestrial vehicle ranging from about 45 degrees to about 360 degrees. In some cases, the controller may be configured to calculate a spatial disposition or detect a characteristic of each of a plurality of targets from different sides of the terrestrial vehicle. The plurality of targets may comprise said target. Alternatively, the controller may be further configured to process (i) a first spatial disposition of a first target as calculated from a first side of the terrestrial vehicle using a first radar antenna array, against (ii) a second spatial disposition of a second target as calculated from a second side of the terrestrial vehicle using a second radar antenna array. A radar antenna array may comprise the first and second radar antenna arrays. In other embodiments, the controller may also be configured to process (i) a first spatial disposition of a target as calculated from a first side of said terrestrial vehicle or using a first radar antenna array, against (ii) a second spatial disposition of the target as calculated from a second side of said terrestrial vehicle or using a second radar antenna array. A radar antenna array may comprise the first and second radar antenna arrays.

In some embodiments, the plurality of antennas may comprise a plurality of receiving antennas. The plurality of signals may comprise phase measurements at adjacent receiving antennas of the plurality of receiving antennas for successive locations of the terrestrial vehicle. The phase measurements may be associated with transmissions of the successive radar pulses. In some cases, the controller may be configured to calculate the spatial disposition of the terrestrial vehicle based at least in part on a relationship between (1) a first difference between a first set of phase measurements at the adjacent receiving antennas, and (2) a second difference between a second set of phase measurements for each of the adjacent receiving antennas corresponding to the transmitted successive radar pulses. In some cases, the controller may be further configured to (i) compute an angle of arrival based in part on the first set of phase measurements at the adjacent receiving antennas, and (ii) determine a motion of the terrestrial vehicle in a two-dimensional plane comprising range and azimuth information based in part from the angle of arrival and the second set of phase measurements for each of the adjacent receiving antennas. The controller may also be configured to convert the range and azimuth information to a set of Cartesian coordinates of the terrestrial vehicle.

In some embodiments, the controller may be configured to calculate a spatial disposition or a characteristic of each of a plurality of targets relative to the terrestrial vehicle. The plurality of targets may comprise the target. In some embodiments, the system may further comprise a plurality of receiving antennas including the receiving antenna. The plurality of receiving antennas may have fixed spatial configurations in lateral and vertical planes. For example, the plurality of receiving antennas may have a fixed spatial configuration in the XY plane, XZ plane, or YZ plane. In some embodiments, the controller may be further configured to calculate the spatial disposition of each of the plurality of targets relative to the terrestrial vehicle in a three-dimensional coordinate space, based at least in part on the fixed spatial configurations of the plurality of receiving antennas in the lateral and/or vertical planes.

In some embodiments, the controller may be configured to preprocess the plurality of signals to reduce a bandwidth of the signals prior to calculating the spatial disposition of the target relative to the terrestrial vehicle. In some cases, the controller may be located onboard the terrestrial vehicle. The controller may comprise a computer processor, an application specific integrated circuit, a graphics processing unit, or a field programmable gate array. In some cases, the vehicle position sensor may be located onboard the terrestrial vehicle and situated separately from the radar antenna array. The vehicle position sensor may comprise at least one member selected from the group consisting of an inertial measurement unit, a global positioning system sensor, a camera, a lidar, a wheel encoder, and a radar.

In another aspect, the present disclosure provides a method for determining a spatial disposition or a characteristic of a target external to a terrestrial vehicle while the terrestrial vehicle is in motion. The method may comprise (a) using a synthetic aperture radar onboard the terrestrial vehicle to collect radar signals having (i) an azimuth resolution within from about 0.05 degrees to 1 degree and (ii) an elevation resolution within from about 2.5 degrees to 10 degrees when the target (1) has a size of at least 0.2 meters, (2) is located within a field of view of the terrestrial vehicle in a forward or rear facing direction of the terrestrial vehicle, and (3) is at a distance of at least about 1 meter from the terrestrial vehicle; and (b) using said radar signals to determine (i) the spatial disposition of the target relative to the terrestrial vehicle or (ii) the characteristic of the target.

In another aspect, the present disclosure provides a method for determining a spatial disposition or a characteristic of a target external to a terrestrial vehicle while the terrestrial vehicle is in motion. The method may comprise (a) using a synthetic aperture radar onboard the terrestrial vehicle to collect radar signals having (i) an azimuth resolution within from about 0.05 degrees to 1 degree and (ii) an elevation resolution within from about 5 degrees to 30 degrees when the target (1) has a size of at least 0.2 meters, (2) is located within a field of view of the terrestrial vehicle in a side facing direction of the terrestrial vehicle, and (3) is at a distance of at least about 1 meter from the terrestrial vehicle; and (b) using the radar signals to determine (i) the spatial disposition of the target relative to the terrestrial vehicle or (ii) the characteristic of the target.

In another aspect, the present disclosure provides a method for determining a spatial disposition or a characteristic of a target external to a terrestrial vehicle. The method may comprise (a) providing a radar antenna array on the terrestrial vehicle, wherein the radar antenna array comprises a transmitting antenna and a receiving antenna; (b) obtaining, with aid of a vehicle position sensor, a spatial disposition of the terrestrial vehicle; and (c) with aid of a controller operatively coupled to the radar antenna array and the vehicle position sensor: (1) synchronizing (i) successive radar pulses transmitted by the transmitting antenna and a plurality of signals received by the receiving antenna, which plurality of signals may correspond to at least a subset of the successive radar pulses and may be generated upon the at least a subset of the successive radar pulses interacting with the target, with (ii) the spatial disposition of the terrestrial vehicle obtained by the vehicle position sensor substantially in real time as the terrestrial vehicle is in motion, to generate a set of synchronized measurements; and (2) using the set of synchronized measurements to determine (i) the spatial disposition of the target relative to the terrestrial vehicle or (ii) the characteristic of the target. In some cases, the method may further comprise, in (a), providing the transmitting antenna and the receiving antenna in a fixed spatial configuration on the terrestrial vehicle. The set of synchronized measurements may be generated based at least in part on the fixed spatial configuration of the transmitting antenna and the receiving antenna. Alternatively, the spatial disposition of the target relative to the terrestrial vehicle or the characteristic of target may be determined substantially in real time while the terrestrial vehicle is moving relative to the target when the target is stationary or in motion. In some embodiments, the method may further comprise, in (c), processing (i) a first spatial disposition of the target as calculated from a first side of the terrestrial vehicle or using a first radar antenna array, against (ii) a second spatial disposition of the target as calculated from a second side of the terrestrial vehicle or using a second radar antenna array, wherein the radar antenna array comprises the first and second radar antenna arrays.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the present disclosure are set forth with particularity in the appended claims. A better understanding of the features and advantages of the present disclosure will be obtained by reference to the following detailed description that sets forth illustrative embodiments, in which the principles of the invention are utilized, and the accompanying drawings (also "Figure" and "FIG." herein), of which:

DETAILED DESCRIPTION

Figure 1A:
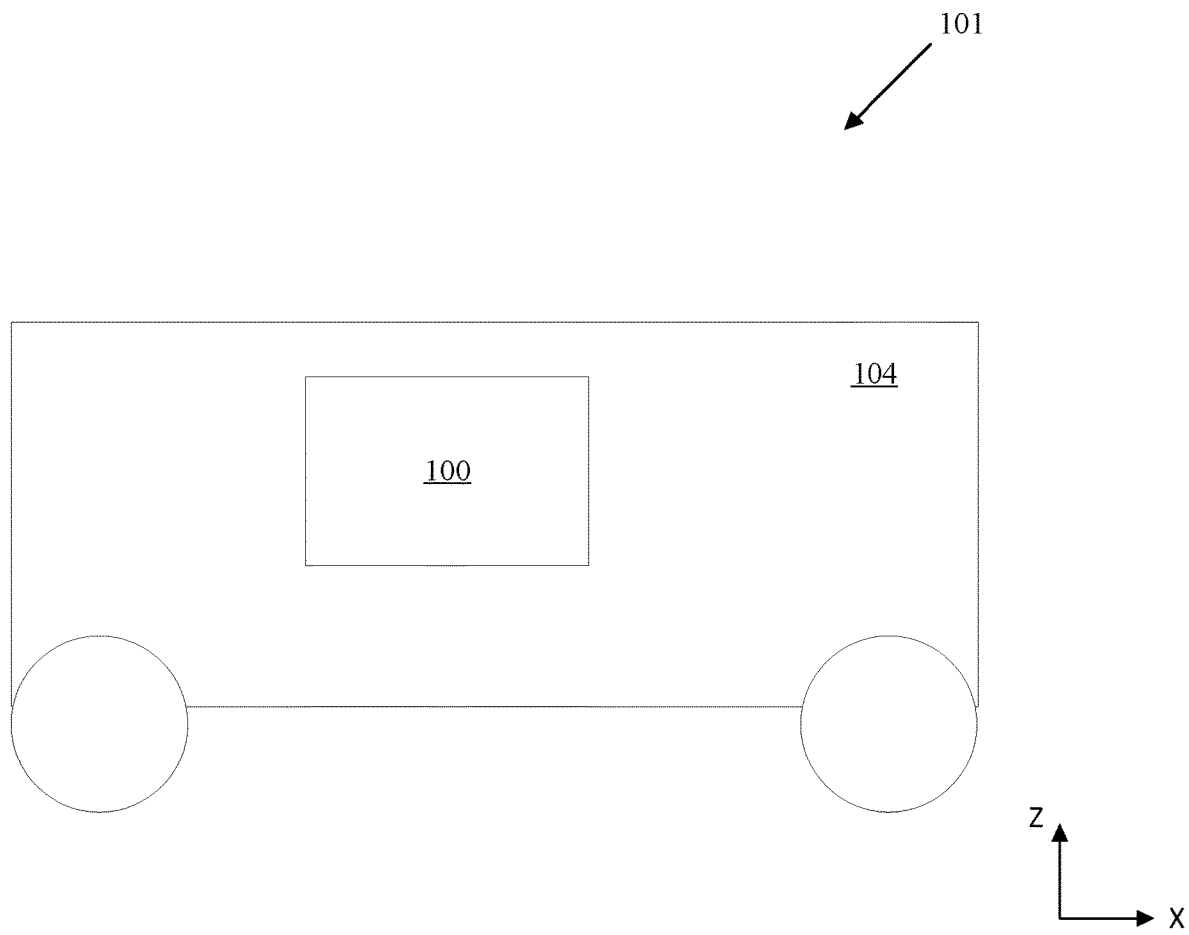
FIG. 1A illustrates a system that can be used on a vehicle to detect one or more targets in a surrounding environment, in accordance with some embodiments.

While various embodiments of the present disclosure have been shown and described herein, it will be obvious to those skilled in the art that such embodiments are provided by way of example only. Numerous variations, changes, and substitutions may occur to those skilled in the art without departing from the present disclosure. It should be understood that various alternatives to the embodiments of the present disclosure described herein may be employed.

The term "terrestrial vehicle," as used herein, generally refers to a vehicle that is configured to operate by contacting the ground or at a location below the ground. In some examples, the terrestrial vehicle is a car, bus, train, truck, bicycle, motorcycle, scooter, boat, submarine, or any transportation device for use on the ground. The terrestrial vehicle can be a car. The terrestrial vehicle can be any machinery that normally operates by contacting the ground or operating below ground, such as, for example, a robot for ground use. The terrestrial vehicle may not be capable of operating in the air or in space. For example, the terrestrial vehicle may not be a plane or a helicopter.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

The present disclosure provides systems and methods that can improve detection of objects from terrestrial vehicles. Existing automotive radar technology may lack the required resolution to (1) sense different objects, (2) distinguish between closely spaced objects, or (3) detect characteristics of objects on the road or in the surrounding environment. Furthermore, existing automotive radar systems tend to have a limited number of antenna channels and limited aperture size due to constraints imposed by automotive vehicle body size. The systems and methods disclosed herein can improve the resolution of a radar-based target detection system on a terrestrial vehicle, for example, by utilizing a Synthetic Aperture Radar (SAR) system (or a SAR-based system). A SAR system as disclosed herein can provide high resolution radar imagery from a moving terrestrial platform or terrestrial vehicle by using the motion path of the platform or vehicle to simulate a large antenna or aperture electronically and/or virtually. A SAR system as disclosed herein may operate similarly to a phased array radar system, but instead of many parallel antenna elements, a single antenna may be used to combine multiple raw radar returns from different geometric positions of a terrestrial vehicle into coherent focused images. In some cases, a SAR system may be configured to achieve high resolution imagery based on a wavelength of a radar signal. A SAR system as disclosed herein may also operate more reliably than target detection systems based on LiDAR (Light Detection and Ranging), which may experience degradation of image resolution in adverse weather (rain, fog, snow) or during nighttime.

FIG. 1A shows a system 100 that may be used on a vehicle 104 to detect one or more targets 102 in a surrounding environment 101. The system may be mounted to any side of the vehicle, or to one or more sides of the vehicle, e.g. a front side, rear side, lateral side, top side, or bottom side of the vehicle. The front side of the vehicle may be the side that is facing a general direction of travel of the vehicle, while a rear (or back) side may be the side that is not facing the general direction of travel of the vehicle. The rear side may be opposite to the front side of the vehicle. The front side of the vehicle may point towards a forward direction of travel of the vehicle. The rear side of the vehicle may point towards a rear direction of travel (e.g. reverse) of the vehicle. The lateral side may include a left side and/or a right side of the vehicle. The vehicle may or may not be configured to move or translate orthogonally to the lateral sides of the vehicle. In some cases, the system disclosed herein may be mounted between two adjacent sides of the vehicle. The system may be oriented to detect one or more targets in front of the vehicle, behind the vehicle, or to the lateral sides of the vehicle.

The methods and systems disclosed herein may be applied to any suitable terrestrial vehicle. A terrestrial vehicle may be a motor vehicle or any other vehicle that uses a source of energy, renewable or nonrenewable (e.g., solar, thermal, electrical, wind, petroleum, etc.), to move across or in close proximity to the ground, such as, for example, within 1 meter, 2 meters, 3 meters of the ground. The terrestrial vehicle may be a self-driving vehicle or may be operated by a living subject, such as a human or animal. The terrestrial vehicle may be stationary, moving, or capable of movement.

The methods and systems disclosed herein may be applied to any suitable aerial vehicle. An aerial vehicle may be a motor vehicle or any other vehicle that uses a source of energy, renewable or nonrenewable, (solar, thermal, electrical, wind, petroleum, etc.) to move through the air or through space. The aerial vehicle may be a self-driving vehicle or may be operated by a living subject, such as a human or animal. The aerial vehicle may be stationary, moving, or capable of movement.

The methods and system disclosed herein may be applied to any suitable aquatic vehicle. An aquatic vehicle may be a motor vehicle or any other vehicle that uses a source of energy, renewable or nonrenewable, (solar, thermal, electrical, wind, petroleum, etc.) to move across or through water. The aquatic vehicle may be a self-driving vehicle or may be operated by a living subject, such as a human or animal. The aquatic vehicle may be stationary, moving, or capable of movement.

The vehicle may be a land-bound vehicle. The vehicle may travel over land. Alternatively or in addition, the vehicle may be capable of traveling on or in water, underground, in the air, and/or in space. The vehicle may be an automobile. The vehicle may be a land-bound vehicle, watercraft, aircraft, and/or spacecraft. The vehicle may travel freely over a surface. The vehicle may travel freely within two or more dimensions. The vehicle may primarily drive on one or more roads.

Optionally, the vehicle may be an unmanned vehicle. The vehicle may not have a passenger or operator on-board the vehicle. The vehicle may or may not have a space within which a passenger may ride. The vehicle may or may not have space for cargo or objects to be carried by the vehicle. The vehicle may or may not have tools that may permit the vehicle to interact with the environment (e.g., collect samples, move objects). The vehicle may or may not have objects that may be emitted to be dispersed to the environment (e.g., light, sound, liquids, pesticides). The vehicle may operate without requiring a human operator.

In some embodiments, the vehicle may permit one or more passengers to ride on-board the vehicle. The vehicle may comprise a space for one or more passengers to ride the vehicle. The vehicle may have an interior cabin with space for one or more passengers. The vehicle may or may not have an operator. For example, a vehicle may have a space for a driver of the vehicle. In some embodiments, the vehicle may be capable of being driven by a human operator. Alternatively or in addition, the vehicle may be operated using an autonomous driving system.

In some embodiments, a vehicle may switch between a manual driving mode during which a human driver may drive the vehicle, and an autonomous driving mode during which an automated controller may generate signals that operate the vehicle without requiring intervention of the human driver. In some embodiments, the vehicle may provide driver assistance where the driver may primarily manually drive the vehicle, but the vehicle may execute certain automated procedures or assist the driver with performing certain procedures (e.g., lane changes, merging, parking, auto-braking). In some embodiments, the vehicle may have a default operation mode. For example, the manual driving mode may be a default operation mode, or an autonomous driving mode may be a default operation mode.

A target may be any object external to the vehicle. A target may be a living being or an inanimate object. A target may be a pedestrian, an animal, a vehicle, a building, a sign post, a sidewalk, a sidewalk curb, a fence, a tree, or any object that may obstruct a vehicle travelling in any given direction. A target may be stationary, moving, or capable of movement.

A target may be located in the front, rear, or lateral side of the vehicle. A target may be positioned at a range of at least about 1 meter (m), 2 m, 3 m, 4 m, 5 m, 10 m, 15 m, 20 m, 25 m, 50 m, 75 m, or 100 m from the vehicle. A target may be located on the ground, in the water, or in the air. A target may be oriented in any direction relative to the vehicle. A target may be orientated to face the vehicle or oriented to face away from the vehicle at an angle ranging from 0 to about 360 degrees. In some embodiments, a target may comprise multiple targets external to a terrestrial vehicle.

A target may have a spatial disposition or characteristic that may be measured or detected. Spatial disposition information may include information about the position, velocity, acceleration, and other kinematic properties of the target relative to the terrestrial vehicle. A characteristic of a target may include information on the size, shape, orientation, and material properties, such as reflectivity, of the target.

In some embodiments, a target may have a size of at least 0.2 meters, be in a side facing direction of a terrestrial vehicle, and be at least about 1 meter from a terrestrial vehicle. In some embodiments, a target may have a size of at least 0.2 meters, be in a forward or rear facing direction of a terrestrial vehicle, and be at least about 1 meter from a terrestrial vehicle.

A surrounding environment may be a location and/or setting in which the vehicle may operate. A surrounding environment may be an indoor or outdoor space. A surrounding environment may be an urban, suburban, or rural setting. A surrounding environment may be a high altitude or low altitude setting. A surrounding environment may include settings that provide poor visibility (night time, heavy precipitation, fog, particulates in the air). A surrounding environment may include targets that are on a travel path of a vehicle. A surrounding environment may include targets that are outside of a travel path of a vehicle.

Figure 1B:
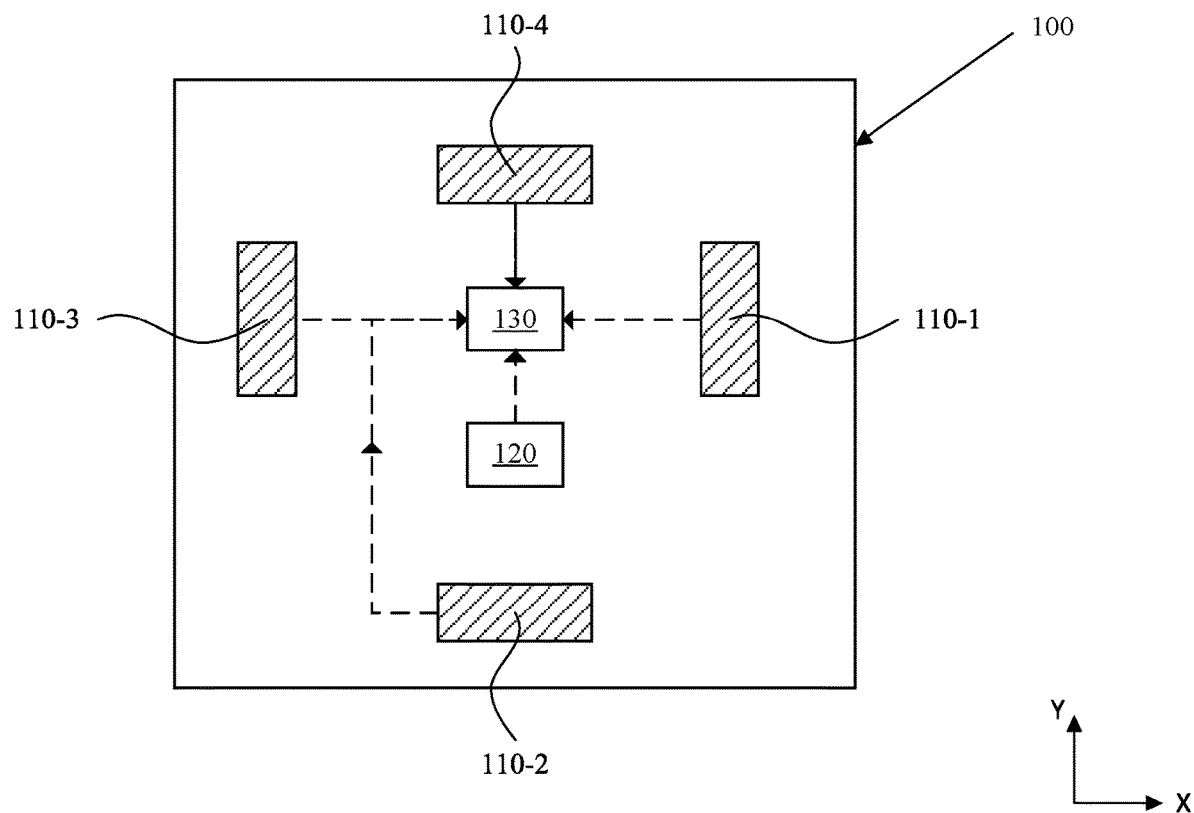
FIG. 1B illustrates a controller operatively coupled to a vehicle position sensor and one or more radar antenna arrays, in accordance with some embodiments.

As illustrated in FIG. 1B, system 100 may include one or more radar antenna arrays 110, a vehicle position sensor 120, and a controller 130. A controller may be operatively coupled to the one or more radar antenna arrays and the vehicle position sensor.

Figure 2:
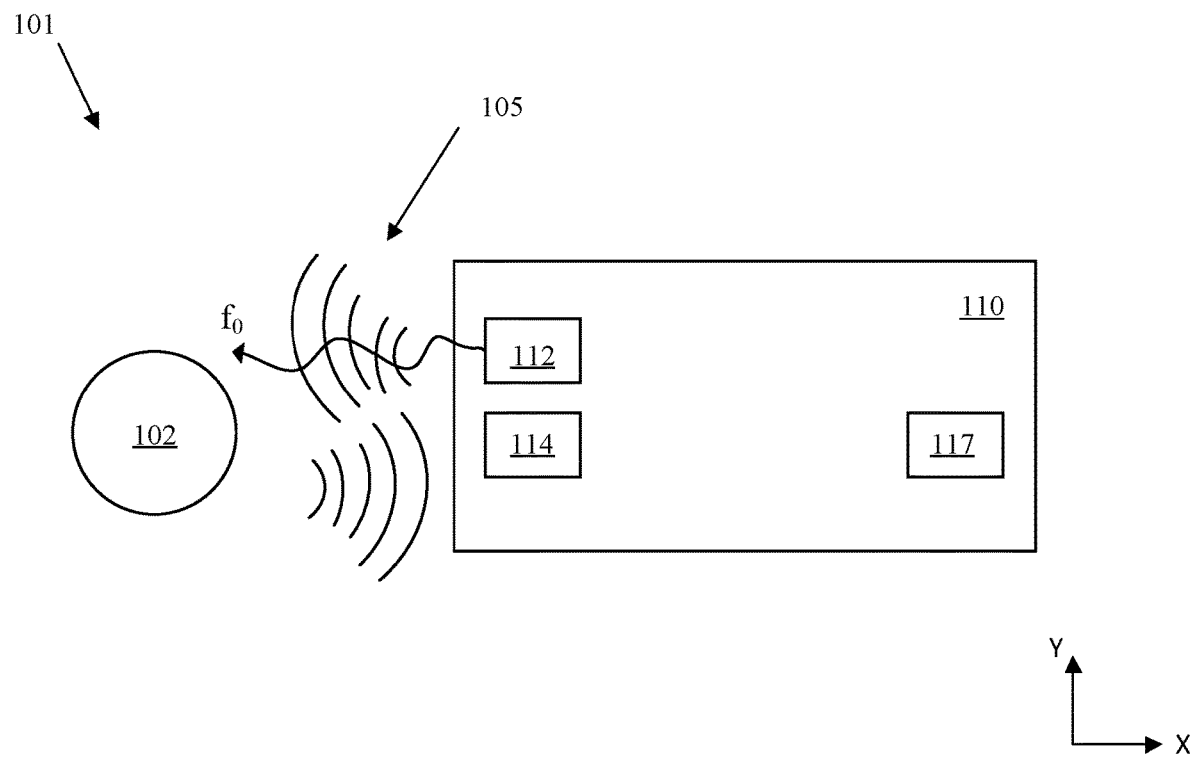
FIG. 2 illustrates a radar antenna array, in accordance with some embodiments.

FIG. 2 shows a radar antenna array 110. The radar antenna array may comprise any one or more of a conventional radar system, a phased array radar system, an AESA (Active Electronically Scanned Array) radar system, a synthetic aperture radar system, a MIMO (Multiple-Input Multiple-Output) radar system, or a phased-MIMO radar system. A conventional radar system may be a radar system that uses radio waves transmitted by a transmitting antenna and received by a receiving antenna to detect objects. A phased array radar system may be a radar system that manipulates the phase of one or more radio waves transmitted by a transmitting and receiving module and uses a pattern of constructive and destructive interference created by the radio waves transmitted with different phases to steer a beam of radio waves in a desired direction. An AESA radar system may be a phased array radar system that uses one or more transmitting and receiving modules to produce one or more beams of radio waves at different phases and/or frequencies. A synthetic aperture radar system may be a phased array radar system that uses a single antenna to combine multiple raw radar returns from different geometric positions into coherent focused images. A MIMO radar system may be a radar system that uses multiple transmitting antennas to transmit a signal independently of other transmitting antennas. A phased-MIMO radar system may be a radar system comprising one or more components or features of a phased array radar system or a MIMO radar system. The radar antenna array may be configured to be mounted to a front side, rear side, or lateral side of a terrestrial vehicle. The radar antenna array may include a transmitting antenna 112, a receiving antenna 114, and a radar antenna array clock 117. In some embodiments, the radar antenna array may include one or more transmitting antennas and/or one or more receiving antennas. The radar antenna array may be used to detect one or more targets 102 in a surrounding environment 101.

A transmitting antenna may be any antenna (dipole, directional, patch, sector, Yagi, parabolic, grid) that can convert electrical signals into electromagnetic waves and transmit the electromagnetic waves. In some embodiments, one or more transmitting antennas may be used to transmit one or more radar pulses. A radar pulse may be any electromagnetic wave transmitted by the transmitting antenna within a frequency range of about 1 Hertz (Hz) to about 300 GigaHertz (GHz). The one or more radar pulses may be successive radar pulses transmitted repeatedly by the one or more transmitting antennas at a pre-defined frequency.

As illustrated in FIG. 2, the successive radar pulses 105 may have a center frequency G. A center frequency may be an arithmetic or geometric mean of a lower and upper cutoff frequency of a radar system. A cutoff frequency may be an upper or lower boundary in a radar system's frequency response at which signal attenuation begins to increase rapidly. The cutoff frequency may be defined as the frequency at which the ratio of power output to power input has a magnitude of about 0.707. The successive radar pulses may have a wavelength associated with the center frequency of the successive radar pulses transmitted by a transmitting antenna.

The one or more radar pulses may be transmitted at a pre-defined frequency equal to a pulse repetition frequency. A pulse repetition frequency may be a rate at which one or more transmitting antennas repeatedly transmit the successive radar pulses. The pulse repetition frequency may be less than or equal to 9 KHz. The pulse repetition frequency may be greater than 9 KHz. The pulse repetition frequency may be at least about 1 KHz, 2 KHz, 3 KHz, 4 KHz, 5 KHz, 6 KHz, 7 KHz, 8, KHz, 9 KHz, or any value between 1 KHz and 9 KHz. In some embodiments, the pulse repetition frequency may preferably range from about 7 KHz to about 9 KHz. The pulse repetition frequency of the radar system may be designed based on maximum vehicle speed. The pulse repetition frequency may be designed so that the time between successive radar pulses corresponds to a vehicle travel distance that is less than a value S. S may be less than 1.5 millimeter (mm) or greater than 2 mm. S may be equal to 1.5 mm or equal to 2 mm. S may be greater than or equal to 1.5 mm. S may be less than or equal to 2 mm. S may be at least about 1.5 mm, 1.6 mm, 1.7 mm, 1.8 mm, 1.9 mm, 2 mm, or any value between 1.5 mm and 2 mm. In some cases, S may be equal to about one-half of the wavelength corresponding to the center frequency of the successive radar pulses.

A receiving antenna may be any antenna (dipole, directional, patch, sector, Yagi, parabolic, grid) that can receive electromagnetic waves and convert the radiofrequency radiation waves into electrical signals. The receiving antenna may be used to receive a subset of the successive radar pulses that are transmitted by the transmitting antenna and reflected back to the receiving antenna after interacting with external targets. In some embodiments, one or more receiving antennas may be used to receive a subset of the successive radar pulses that are transmitted by one or more transmitting antennas and reflected back to the one or more receiving antennas after interacting with external targets.

In some embodiments, the clock may be a real time clock or a system clock. A real time clock may be a clock that keeps track of time when a system is turned off. A real time clock may be a hardware-implemented clock. The real time clock may be battery-powered. A system clock may be software-implemented clock. A system clock may be based on the frequency of a processor.

In other embodiments, the clock may be a common clock or an independent clock. A common clock may be a clock that provides a common time to one or more components in a system. An independent clock may be a clock that provides time information for data derived independently from one or more components or subcomponents in a system.

Figure 3:
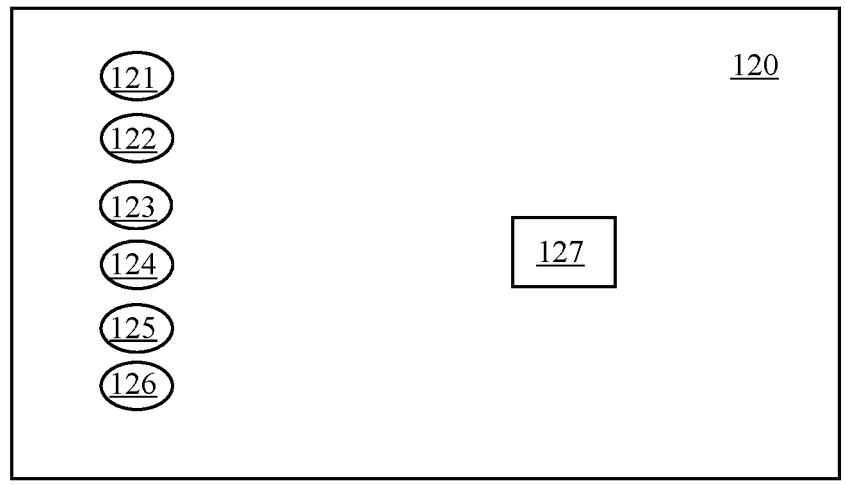
FIG. 3 illustrates a vehicle position sensor, in accordance with some embodiments.

FIG. 3 shows a vehicle position sensor 120. A vehicle position sensor may include any sensor that can obtain the spatial disposition of a terrestrial vehicle. In some embodiments, the vehicle position sensor may include a global positioning system (GPS) sensor 121, an inertial measurement unit (IMU) 122, a camera 123, a LIDAR 124, a radar 125, a wheel encoder 126, or any other sensor that may be used to monitor the position of a moving object. Position sensors may include location sensors (e.g., global positioning system (GPS) sensors, mobile device transmitters enabling location triangulation), vision sensors (e.g., imaging devices capable of detecting visible, infrared, or ultraviolet light, such as cameras), proximity or range sensors (e.g., ultrasonic sensors, lidar, time-of-flight or depth cameras), inertial sensors (e.g., accelerometers, gyroscopes, inertial measurement units (IMUs)), altitude sensors, attitude sensors (e.g., compasses), pressure sensors (e.g., barometers), audio sensors (e.g., microphones) or field sensors (e.g., magnetometers, electromagnetic sensors).

In some embodiments, the vehicle position sensor may be located onboard the terrestrial vehicle and situated separately from the radar antenna array. The vehicle position sensor may include a vehicle position sensor clock 127. In some embodiments, the clock may be a real time clock or a system clock. In other embodiments, the clock may be a common clock or an independent clock.

Figure 4:
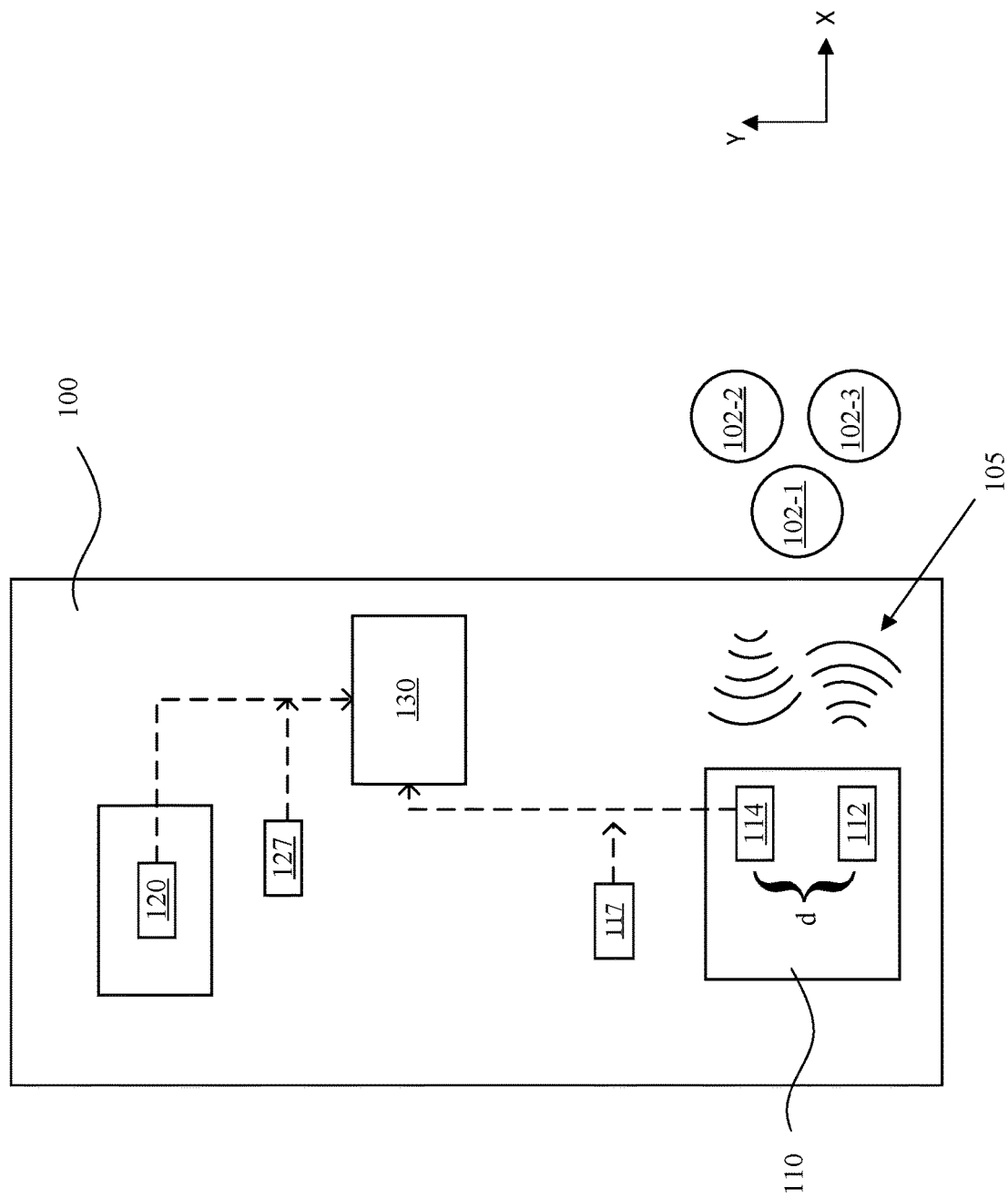
FIG. 4 illustrates a system that can use a controller to synchronize measurements taken from a vehicle position sensor and a radar antenna array, in accordance with some embodiments.

FIG. 4 shows a controller 130 operatively coupled to a radar antenna array 110 and a vehicle position sensor 120. The controller may be used to synchronize measurements taken by the system. The controller may be implemented onboard the terrestrial vehicle or off-site on a server. The controller may comprise a computer processor, application specific integrated circuit, a graphics processing unit, or a field programmable gate array.

In some embodiments, the controller 130 may be configured to obtain a first set of measurements from a radar antenna array. As illustrated in FIG. 4, the first set of measurements may be based on successive radar pulses 105 transmitted by the transmitting antenna and a plurality of signals received by the receiving antenna. The plurality of signals received by the receiving antenna may include a subset of the successive radar pulses that are transmitted by the transmitting antenna and reflected back to the receiving antenna after interacting with external targets 102-1, 102-2, 102-3. The controller can also be configured to obtain a second set of measurements from a vehicle position sensor. The second set of measurements may include information on the spatial disposition of a vehicle. The vehicle position sensor may obtain a spatial disposition of a terrestrial vehicle in real time. The terrestrial vehicle may be stationary or in motion. The controller may also be configured to synchronize the first set of measurements with the second set of measurements using a radar antenna array clock 117 and a vehicle position sensor clock 127 to generate a set of synchronized measurements. The controller may be further configured to use the synchronized measurements to determine a spatial disposition of a target or a characteristic of a target.

In one embodiment, synchronization may be achieved by a common clock that may be provided to both the radar and positioning sensor (the positioning sensor may be an IMU, GPS, lidar, etc). Each sensor may derive its own sampling frequency as a multiple of this clock, so that the relative timing is known based on the nominal sampling frequencies.

In another embodiment, synchronization may be achieved by a common clock that may be provided to both the radar and positioning sensor. Each sensor may sample data independently, but may calculate a timestamp or index for each sample relative to the shared clock. In a further embodiment, each sensor may be equipped with its own independent clock source. Each sensor may use the shared clock as a coarse time reference, and its own clock as a fine time reference. In a further embodiment, the independent clock may be compared to the shared clock and its frequency may be compensated or adjusted based on the nominal frequency of the common clock.

In some embodiments, synchronization may be achieved by a GPS receiver that can generate a clock signal with a predetermined output rate, which is derived from GPS satellite time. The output rate may be one pulse-per-second (PPS) or a different output rate. The reference signal may be provided to a positioning and radar sensor. The GPS receiver may be collocated and integrated with the positioning sensor, or separate. The GPS clock signal may function as the common clock described in previous embodiments.

In other embodiments, synchronization may be achieved by a radar system that can generate a radar clock signal which may be provided to a position sensor or GPS receiver. The radar clock signal may be approximately equal to the sampling frequency of the radar system. The GPS may generate its measurements synchronously with the radar clock signal. In one embodiment, synchronization may be achieved by a GPS receiver that can provide both a clock signal as well as absolute GPS timestamps over a data channel. The radar and/or position sensor may operate as in previous embodiments, but may additionally use the absolute GPS timestamps to compute the absolute time of their measurements.

In one embodiment, synchronization may be achieved by a radar sensor that can use a higher-frequency clock to provide fine timing information in addition to the coarse timing information from the GPS PPS. In another embodiment, synchronization may be achieved by compensating or adjusting the frequency of the radar's independent clock based on the observed PPS signal.

In some cases, synchronization may be achieved by using phase shift measurements to determine changes in vehicle position or target position. Phase measurements may be measurements of the difference in phase between a first signal transmitted by a transmitting antenna and a second signal received by a receiving antenna. The second signal may be a subset of the first signal reflected off a target after the first signal interacts with the target. Alternatively, synchronization may be achieved through any combination of the synchronization methods described herein.

In some embodiments, the controller may be configured to control the pulse repetition frequency of successive radar pulses transmitted by a transmitting antenna. The pulse repetition frequency may be approximately equal to the inverse of the time duration for a terrestrial vehicle to travel a fraction of the wavelength of the transmitted radar pulses. The wavelength of the transmitted radar pulse may range from 3 mm to 4 mm. The wavelength of the transmitted radar pulse may be less than or equal to 3 mm. The wavelength of the transmitted radar pulse may be greater than or equal to 4 mm. A fraction of the wavelength may be less than or equal to about 1, 0.75, 0.67, 0.5, 0.33, 0.25, 0.2, or 0.1 of the wavelength. In some cases, a fraction of the wavelength described herein may be greater than 1. For example, a fraction of the wavelength may be at least about 1.25, 1.5, 1.75, 2, 3, 4, 5, 6, 7, 8, 9, or 10 times the wavelength.

In some embodiments, the controller may also be configured to pre-process signals received from the transmitting antenna, the receiving antenna, or the vehicle position sensor to reduce the bandwidth of received signals before calculating the spatial disposition or characteristic of an external target. Pre-processing can include peak-detection methods, Fourier transform methods, filtering methods, smoothing methods, or any other methods that are used to modify or transform a signal.

In some embodiments, the controller may be configured to synchronize signals received from the transmitting antenna, receiving antenna, or vehicle position sensor, either relative to each other or relative to an absolute time, using one or more clocks that may be provided on at least one of a radar antenna array or a vehicle position sensor.

In some embodiments, the controller may be configured to calculate a spatial disposition or characteristic of each of a plurality of targets external to a terrestrial vehicle.

FIG. 4 shows a controller operatively coupled to a radar antenna array and a vehicle position sensor. The radar antenna array may comprise a transmitting antenna 112 and a receiving antenna 114 arranged in a fixed spatial configuration relative to one another. In some embodiments, the transmitting and receiving antenna may be arranged so that they are in the same plane. In other embodiments, the transmitting and receiving antenna may or may not be on substantially the same plane. For example, the transmitting antenna may be on a first plane and the receiving antenna may be on a second plane. The first plane and second plane may be parallel to one another. Alternatively, the first and second planes need not be parallel, and may intersect one another. In some cases, the first plane and second plane may be perpendicular to one another.

The transmitting and receiving antenna may or may not be at the same elevation above ground or at different elevations above ground. There transmitting and receiving antenna may or may not have a vertical or horizontal degree of orientation. A vertical degree of orientation may be less than or equal to about 90 degrees, 80 degrees, 70 degrees, 60 degrees, 50 degrees, 40 degrees, 30 degrees, 20 degrees, 10 degrees, 5 degrees, 3 degrees, or 1 degree. A horizontal degree of orientation may be less than or equal to about 90 degrees, 80 degrees, 70 degrees, 60 degrees, 50 degrees, 40 degrees, 30 degrees, 20 degrees, 10 degrees, 5 degrees, 3 degrees, or 1 degree.

The transmitting and receiving antenna may be arranged to have the same vertical degree of orientation. For instance, the transmitting and receiving antenna may be arranged with zero degrees of vertical orientation. In another example, the transmitting and receiving antenna may be angled slightly upwards, or may be angled slightly downwards. Alternatively, the transmitting and receiving antenna may have slightly different vertical orientations. For example, one transmitting and/or receiving antenna may be angled slightly upwards, while the other transmitting and/or receiving antenna may be angled slightly downwards or straight horizontally. In some embodiments, the transmitting and receiving antenna may have slightly different horizontal and/or vertical orientations or substantially different horizontal and/or vertical orientations. The variations in horizontal and/or vertical orientations may allow the system to detect different objects of various heights (e.g., children who may be below a certain height and not easily detected, small animals such as pets, bicycles, motorcycles, trucks such as 18-wheelers, trucks with tailgates, etc.).

In some cases, a transmitting antenna may be aligned in a first direction and a receiving antenna may be aligned in a second direction. An angle between the first direction and the second direction may range from about 0 degrees to about 360 degrees in the XY plane, the XZ plane, or the YZ plane. The angle between the first direction and second direction may be at least about 0 degree, 45 degrees, 90 degrees, 135 degrees, 180 degrees, 225 degrees, 270 degrees, 315 degrees, 360 degrees, or any value between 0 degrees and 360 degrees. Alternatively, a transmitting antenna may be located on a first plane and a receiving antenna may be located on a second plane, and the first plane and second plane may be distinct planes that are not parallel or perpendicular to each other.

The fixed spatial configuration may also involve a relative fixed distance d between the transmitting and receiving antennas. The relative fixed distance may be at least about 1 millimeter (mm), 2 mm, 3 mm, 4 mm, 5 mm, 6 mm, 7 mm, 8 mm, 9 mm, 10 mm, 10 centimeter (cm), 100 cm, or 1 meter. The relative fixed distance may have a tolerance based on a pre-defined threshold value. The threshold value may be associated with a percentage of a wavelength of a transmitted radar pulse or a percentage of a fraction of a wavelength of a transmitted radar pulse.

The fixed spatial configuration may be substantially maintained by rigidly mounting one or transmitting and/or receiving antennas to a support structure. The support structure may keep the transmitting and receiving antennas at fixed positions relative to one another. Movement of the vehicle may cause less than about 5 degrees, 3 degrees, 2 degrees, 1 degree, 0.5 degree or 0.1 degree variance in the angles relative to one another and/or relative to the environment. Such movement of less than the degrees provided may constitute the transmitting and/or receiving antennas being substantially fixed. The support structure may be formed from a substantially rigid material. In some alternative embodiments, the transmitting and receiving antennas may move relative to one another. During operation of the vehicle, the transmitting and receiving antennas may move relative to the vehicle body. The support structure may comprise one or more hinges, ball joints, tracks, slides, grooves, or other mechanisms that may allow the transmitting and receiving antennas to move relative to one another. The support structure may comprise one or more actuator that may cause the transmitting and receiving antennas to move relative to one another. In some embodiments, the transmitting and receiving antennas may be supported by a carrier on the support structure. The carrier may be gimbal as described elsewhere herein. The carrier may comprise a one-axis gimbal, two-axis gimbal, or three-axis gimbal. The transmitting and receiving antennas may rotate about a yaw, pitch, and/or roll axis relative to the support structure. In some embodiments, at some moment in time, the carrier may hold the transmitting and receiving antennas at fixed positions relative to one another, the support structure, and/or the vehicle. In some embodiments, the carrier may permit movement about one, two, or more degrees of freedom relative to the support structure, vehicle, or inertial reference frame, to maintain a fixed disposition between the transmitting and receiving antennas. The transmitting and receiving antennas may rotate about the same amount in the same direction. In some instances, the fixed disposition may be maintained with aid of one or more linkages. The linkages may comprise serial or parallel linkages. The linkages may be multi-bar linkages. The fixed disposition may be maintained with aid of a kinematic coupling. The fixed disposition may be maintained by mechanically coupling the transmitting and receiving antennas units in a rigid manner. The disposition of the transmitting and receiving antennas may be controlled in real-time. The disposition of the transmitting and receiving antennas may be controlled during operation of the vehicle.

The transmitting and receiving antennas may be held within a recess or sleeve of the common support. The transmitting and receiving antennas may be attached with aid of brackets, or other types of fasteners, to the common support. The transmitting and receiving antennas may be completely or partially embedded in the common support. The transmitting and receiving antennas on a common support may be located close to one another. In some embodiments, there may be a distance of less than about 30 centimeters (cm), 20 cm, 15 cm, 10 cm, 7 cm, 5 cm, 3 cm, 2 cm, 1 cm, 0.5 cm, or 0.1 cm between adjacent transmitting and/or receiving antennas. The transmitting and receiving antennas may be supported by the support structure. The weight of the transmitting and receiving antennas may be borne by the support structure.

In some embodiments, the support structure may be built into a chassis of the vehicle or integrated into a chassis of the vehicle. The chassis of the vehicle may include an internal frame of the vehicle or a body panel of the vehicle. In some cases, a portion of the vehicle chassis may comprise a material that may enhance a radar signal. A radar signal may be enhanced if the strength of the signal is increased relative to the noise of the signal.

The support structure may be able to decouple the one or more transmitting and/or receiving antennas from vibrations, shocks, or impacts experienced by a vehicle in motion. In some embodiments, the fixed spatial configuration may also be modified or controlled by a mechanism configured to adjust and/or calibrate the alignment or location of one or more transmitting and/or receiving antennas. The mechanism may be an open loop control system, a closed loop control system, a feedback loop system, a feedforward loop system, or any combination thereof.

The controller may be used to synchronize measurements taken by the system. The controller may be implemented onboard the terrestrial vehicle or off-site on a server. The controller may comprise a computer processor, application specific integrated circuit, a graphics processing unit, or a field programmable gate array. In some embodiments, the controller may be configured to obtain a first set of measurements from a radar antenna array. The first set of measurements may be based on successive radar pulses transmitted by the transmitting antenna and a plurality of signals received by the receiving antenna. The plurality of signals received by the receiving antenna may include a subset of the successive radar pulses that are transmitted by the transmitting antenna and reflected back to the receiving antenna after interacting with external targets. The controller can also be configured to obtain a second set of measurements from a vehicle position sensor. The second set of measurements may include information on the spatial disposition of a vehicle. The vehicle position sensor may obtain a spatial disposition of a terrestrial vehicle in real time. The terrestrial vehicle may be stationary or in motion. The controller may also be configured to synchronize the first set of measurements with the second set of measurements to generate a set of synchronized measurements. The synchronized measurements may be generated based at least in part on a fixed spatial configuration of one or more receiving antennas and/or one or more transmitting antennas. The controller may be further configured to use the synchronized measurements to determine a spatial disposition of a target or a characteristic of a target.

Figure 5:
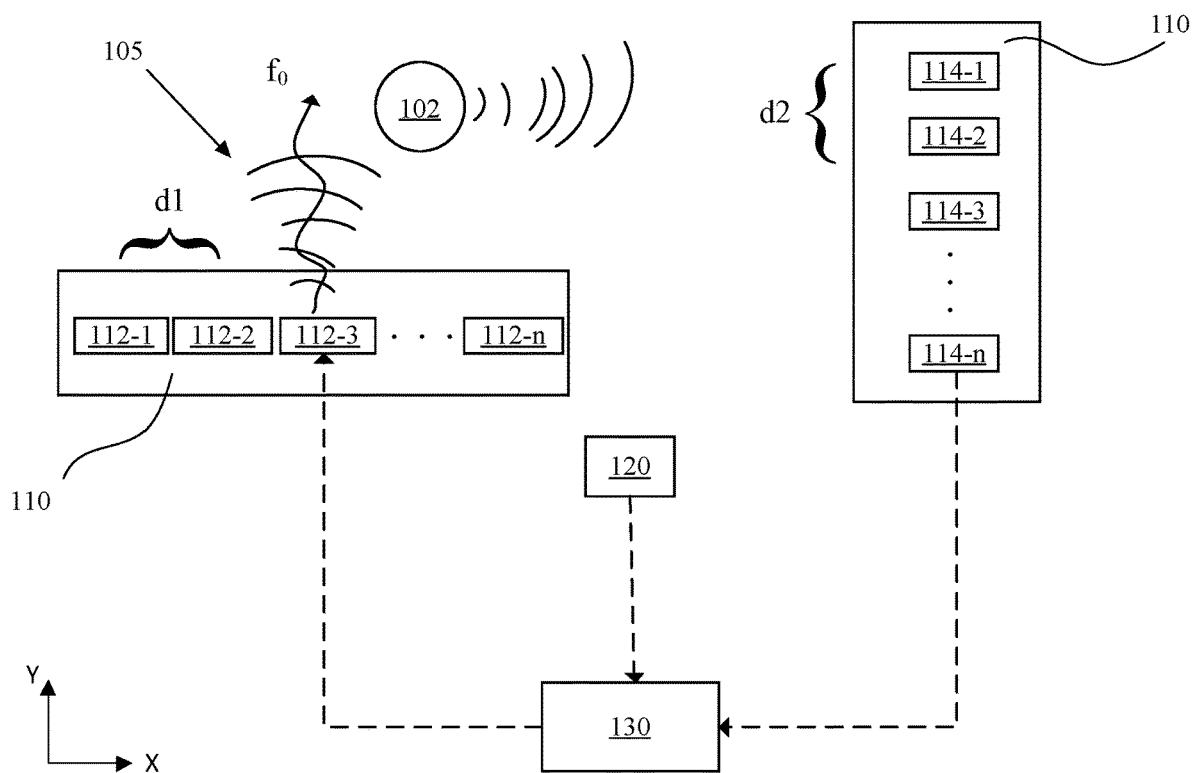
FIG. 5 illustrates a system that can use a plurality of transmitting or receiving antennas to sense a spatial disposition or characteristic of a target, in accordance with some embodiments.

FIG. 5 shows a controller 130 operatively coupled to a radar antenna array 110 and a vehicle position sensor 120. The radar antenna array may comprise a plurality of transmitting antennas 112 and/or a plurality of receiving antennas 114. A distance d1 between adjacent transmitting antennas may be less than one-quarter or greater than ten times the wavelength of a center frequency $f_0$ of the successive radar pulses 105 transmitted by the transmitting antenna. The distance d1 between adjacent transmitting antennas may range from about one-quarter to about ten times of a wavelength of a center frequency $f_0$ of the successive radar pulses transmitted by the transmitting antenna. The distance d1 between adjacent transmitting antennas may be at least about 0.25, 0.5, 0.75, 1, 2, 3, 4, 5, 6, 7, 8, 9, or 10 times the wavelength of a center frequency $f_0$ of the successive radar pulses transmitted by the transmitting antenna, or any value in between about 0.25 and 10 times the wavelength of a center frequency of successive radar pulses transmitted by a transmitting antenna. The distance d1 between adjacent transmitting antennas may be greater than, less than, or approximately equal to one-half of the wavelength of a center frequency $f_0$ of the successive radar pulses transmitted by the transmitting antenna. The distance d1 between adjacent transmitting antennas may be at least about 1 millimeter (mm), 2 mm, 3 mm, 4 mm, 5 mm, 6 mm, 7 mm, 8 mm, 9 mm, 10 mm, 10 centimeters (cm), 100 cm, or 1 meter. Alternatively, the distance d1 between adjacent transmitting antennas may be at most about 1 millimeter (mm), 2 mm, 3 mm, 4 mm, 5 mm, 6 mm, 7 mm, 8 mm, 9 mm, 10 mm, 10 centimeters (cm), 100 cm, or 1 meter. The distance d1 between adjacent transmitting antennas may range from about 1 millimeter (mm) to 1 meter. A distance d2 between adjacent receiving antennas may be less than one-quarter or greater than ten times the wavelength of a center frequency $f_0$ of the successive radar pulses transmitted by the transmitting antenna. The distance d2 between adjacent receiving antennas may range from about one-quarter to about ten times of a wavelength of a center frequency $f_0$ of the successive radar pulses transmitted by the transmitting antenna. The distance d2 between adjacent receiving antennas may be at least about 0.25, 0.5, 0.75, 1, 2, 3, 4, 5, 6, 7, 8, 9, or 10 times the wavelength of a center frequency $f_0$ of the successive radar pulses transmitted by the transmitting antenna, or any value in between about 0.25 and 10 times the wavelength of a center frequency of successive radar pulses transmitted by a transmitting antenna. The distance d2 between adjacent receiving antennas may be greater than, less than, or approximately equal to one-half of the wavelength of a center frequency $f_0$ of the successive radar pulses transmitted by the transmitting antenna. The distance d2 between adjacent receiving antennas may be at least about 1 millimeter (mm), 2 mm, 3 mm, 4 mm, 5 mm, 6 mm, 7 mm, 8 mm, 9 mm, 10 mm, 10 centimeters (cm), 100 cm, or 1 meter. Alternatively, the distance d2 between adjacent receiving antennas may be at most about 1 millimeter (mm), 2 mm, 3 mm, 4 mm, 5 mm, 6 mm, 7 mm, 8 mm, 9 mm, 10 mm, 10 centimeters (cm), 100 cm, or 1 meter. The distance d2 between adjacent receiving antennas may range from about 1 millimeter (mm) to 1 meter. In some cases, d1 may be equal to d2. In some cases, d1 may be greater than or less than d2.

The controller may be used to synchronize measurements taken by the system. The controller may be implemented onboard the terrestrial vehicle or off-site on a server. The controller may comprise a computer processor, application specific integrated circuit, a graphics processing unit, or a field programmable gate array. In some embodiments, the controller may be configured to obtain a first set of measurements from a radar antenna array. The first set of measurements may be based on successive radar pulses transmitted by the transmitting antenna and a plurality of signals received by the receiving antenna. The plurality of signals received by the receiving antenna may include a subset of the successive radar pulses that are transmitted by the transmitting antenna and reflected back to the receiving antenna after interacting with external targets. The controller can also be configured to obtain a second set of measurements from a vehicle position sensor. The second set of measurements may include information on the spatial disposition of a vehicle. The vehicle position sensor may obtain a spatial disposition of a terrestrial vehicle in real time. The terrestrial vehicle may be stationary or in motion. The controller may also be configured to synchronize the first set of measurements with the second set of measurements to generate a set of synchronized measurements. The controller may be further configured to use the synchronized measurements to determine a spatial disposition of a target or a characteristic of a target. In some cases, the controller may be operatively coupled to the transmitting antenna. The controller may also be configured to control the pulse repetition frequency of the successive radar pulses sent by the transmitting antenna to be greater than an inverse of a time duration for a terrestrial vehicle to travel a length approximately equal to a distance between adjacent receiving antennas.

Figure 6A:
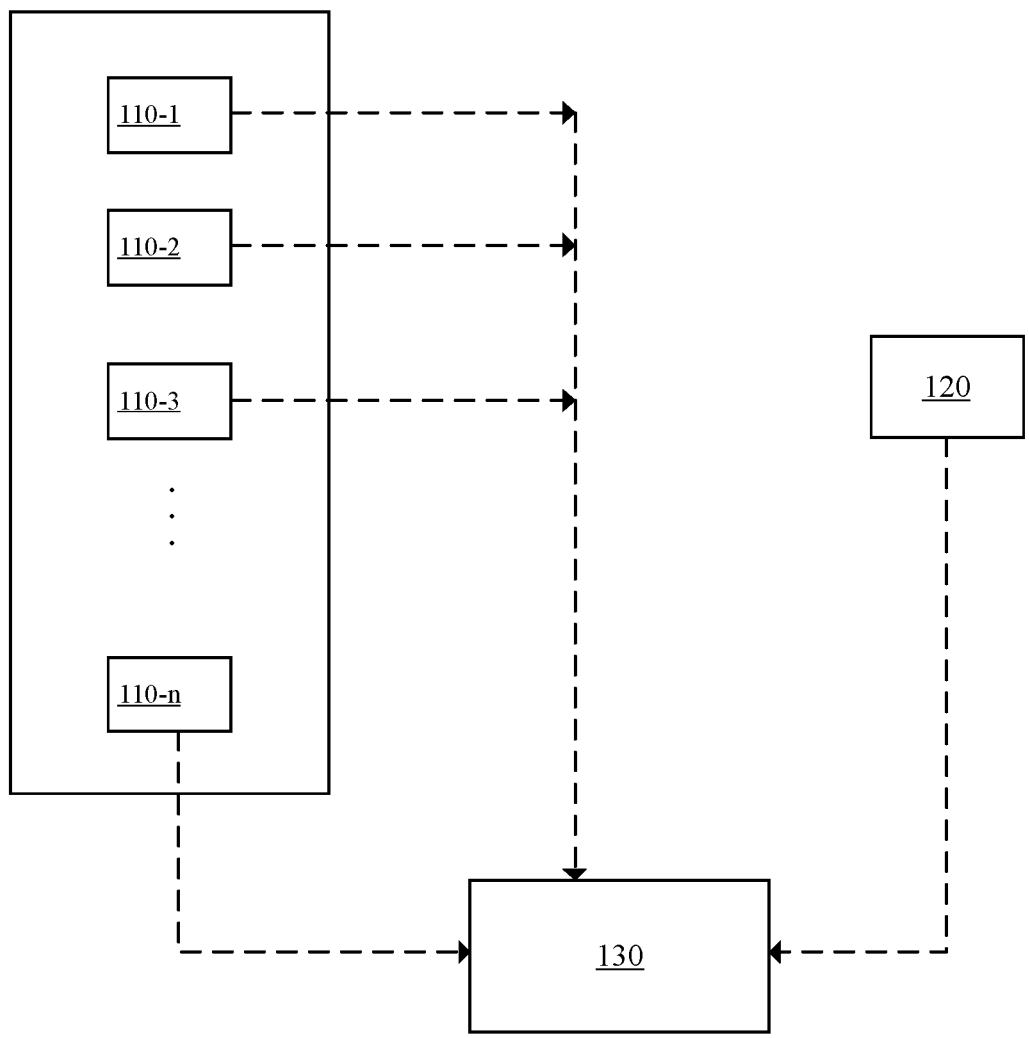
FIG. 6A illustrates a system that can use a plurality of radar antenna arrays to sense a spatial disposition or characteristic of a target, in accordance with some embodiments.
Figure 6B:
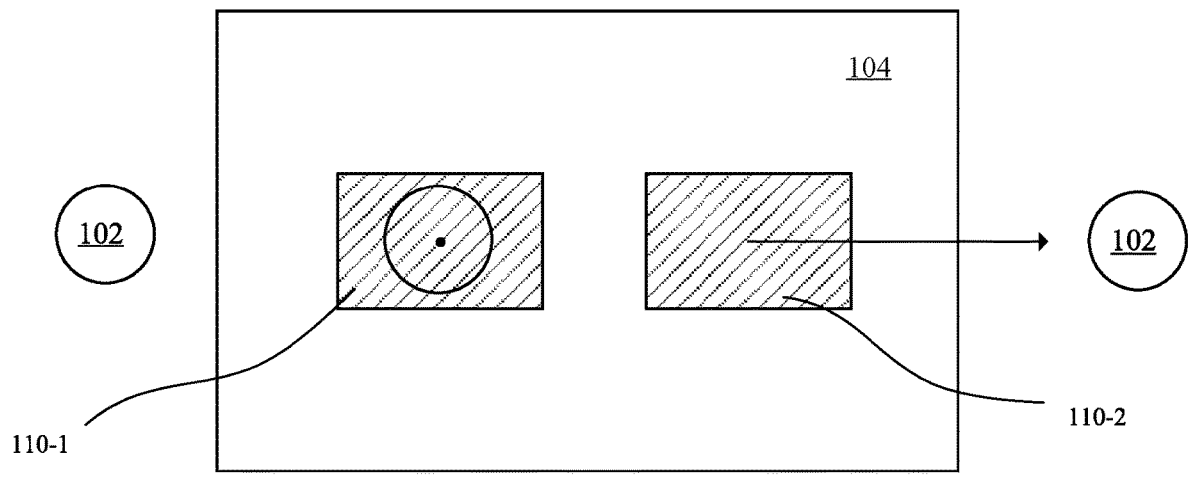
FIG. 6B illustrates various mounting configurations and orientations for one or more radar antenna arrays, in accordance with some embodiments.

FIG. 6A shows a controller 130 operatively coupled to a vehicle position sensor 120 and a plurality of radar antenna arrays 110-1, 110-2, 110-3, and so on, up to an nth radar antenna array, where n may be any integer greater than 1. In some embodiments, the plurality of radar antenna arrays may be configured to be mounted on the same side or different sides of a terrestrial vehicle. For example, one or more radar antenna arrays may be mounted on the top, bottom, front side, rear side, or lateral sides of the terrestrial vehicle. As shown in FIG. 6B, the plurality of radar antenna arrays 110-1 and 110-2 may also be configured to be mounted in the same or different orientations. For example, one or more radar antenna arrays may be oriented to detect one or more targets 102 in front of the vehicle, behind the vehicle, or to the sides of the vehicle 104. Alternatively, one or more radar antenna arrays be located in the same plane or in different planes. In some embodiments, the plurality of radar antenna arrays may be configured to provide multi-angle sensing coverage ranging from about 45 degrees to about 360 degrees around the vehicle. In some cases, coverage can be less than 45 degrees. For example, the coverage may be at least about 0 degree, 5 degrees, 10 degrees, 15 degrees, 20 degrees, 25 degrees, 30 degrees, 35 degrees, 40 degrees, 45 degrees, or any value between 0 degrees and 45 degrees.

The controller may be used to synchronize measurements taken by the system. The controller may be implemented onboard the terrestrial vehicle, off-site on a server, or through a combination of both. The controller may comprise a computer processor, application specific integrated circuit, a graphics processing unit, or a field programmable gate array. In some embodiments, the controller may be configured to obtain a first set of measurements from a radar antenna array. The first set of measurements may be based on successive radar pulses transmitted by the transmitting antenna and a plurality of signals received by the receiving antenna. The plurality of signals received by the receiving antenna may include a subset of the successive radar pulses that are transmitted by the transmitting antenna and reflected back to the receiving antenna after interacting with external targets. The controller can also be configured to obtain a second set of measurements from a vehicle position sensor. The second set of measurements may include information on the spatial disposition of a vehicle. The vehicle position sensor may obtain a spatial disposition of a terrestrial vehicle in real time. The terrestrial vehicle may be stationary or in motion. The controller may also be configured to synchronize the first set of measurements with the second set of measurements to generate a set of synchronized measurements. The controller may be further configured to use the synchronized measurements to determine a spatial disposition of a target or a characteristic of a target. In some cases, the controller may be configured to process a first spatial disposition of a target against a second spatial disposition of the target during synchronization of measurements. The first spatial disposition may be calculated from a first side of said vehicle or using a first radar antenna. The second spatial disposition may be calculated from a second side of said vehicle or using a second radar antenna. In some cases, processing the first spatial disposition against the second spatial disposition may involve correlating the first spatial disposition with the second spatial disposition, determining a difference between the first and second spatial dispositions, or calculating a vector between the first and second spatial dispositions. In some cases, processing the first spatial disposition against the second spatial disposition may involve combining sensor measurements obtained by multiple sensors using any known sensor fusion techniques, which can include algorithms based on a Kalman filter, an extended Kalman filter (EKF), an unscented Kalman filter (UKF), a particle filter (PF), or suitable combinations thereof. For instance, sensor fusion can be used to combine sensing measurements obtained by different sensor types, including as GPS sensors, inertial sensors, vision sensors, lidar, ultrasonic sensors, and so on. As another example, sensor fusion can be used to combine different types of sensing measurements, such as absolute measurement data (e.g., data provided relative to a global coordinate system such as GPS data) and relative measurement data (e.g., data provided relative to a local coordinate system such as vision sensing data, lidar data, or ultrasonic sensing data). Sensor fusion can be used to compensate for limitations or inaccuracies associated with individual sensor types, thereby improving the accuracy and reliability of the measurement.

Figure 6C:
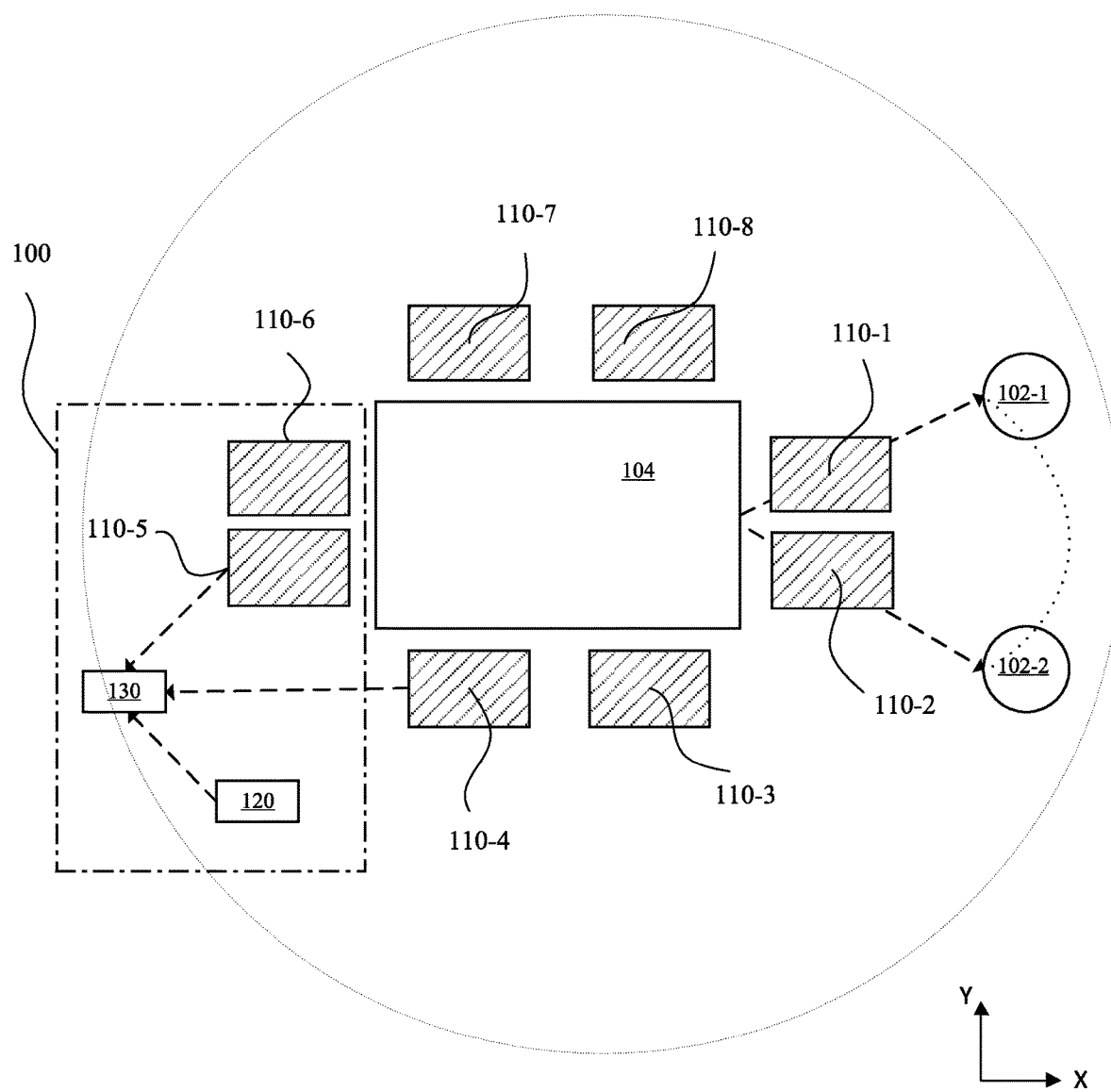
FIG. 6C illustrates a system that can use a plurality of radar antenna arrays to sense spatial dispositions or characteristics of a plurality of targets, in accordance with some embodiments.

FIG. 6C shows a system 100 that may be used on a vehicle 104 to detect a plurality of targets 102-1, 102-2. The plurality of targets may be located in different positions in front of, behind, or to the sides of the terrestrial vehicle. The system may comprise a controller operatively coupled to a vehicle position sensor 120 and a plurality of radar antenna arrays 110-1, 110-2, 110-3, 110-4, 110-5, 110-6, 110-7, 110-8. In some embodiments, the plurality of radar antenna arrays may be configured to be mounted on the same side or different sides of a terrestrial vehicle. For example, one or more radar antenna arrays may be mounted on the top, bottom, front side, rear side, or lateral sides of the terrestrial vehicle. The plurality of radar antenna arrays may also be configured to be mounted in the same or different orientations. For example, one or more radar antenna arrays may be oriented to detect one or more targets in front of the vehicle, behind the vehicle, or to the sides of the vehicle.

The controller may be used to synchronize measurements taken by the system. The controller may be implemented onboard the terrestrial vehicle or off-site on a server. The controller may comprise a computer processor, application specific integrated circuit, a graphics processing unit, or a field programmable gate array. In some embodiments, the controller may be configured to obtain a first set of measurements from a radar antenna array. The first set of measurements may be based on successive radar pulses transmitted by the transmitting antenna and a plurality of signals received by the receiving antenna. The plurality of signals received by the receiving antenna may include a subset of the successive radar pulses that are transmitted by the transmitting antenna and reflected back to the receiving antenna after interacting with external targets. The controller can also be configured to obtain a second set of measurements from a vehicle position sensor. The second set of measurements may include information on the spatial disposition of a vehicle. The vehicle position sensor may obtain a spatial disposition of a terrestrial vehicle in real time. The terrestrial vehicle may be stationary or in motion. The controller may also be configured to synchronize the first set of measurements with the second set of measurements to generate a set of synchronized measurements. The controller may be further configured to use the synchronized measurements to determine a spatial disposition of a target or a characteristic of a target. In some cases, the controller may be configured to process a first spatial disposition of a first target against a second spatial disposition of a second target. The first spatial disposition may be calculated from a first side of said vehicle using a first radar antenna. The second spatial disposition may be calculated from a second side of said vehicle using a second radar antenna. Processing the first and second spatial dispositions may involve correlating the first and second spatial dispositions, determining a difference between the first and second spatial dispositions, calculating a vector between the first and second spatial dispositions, or combining sensor measurements obtained by multiple sensors using any known sensor fusion techniques, as described elsewhere herein.

Figure 7:
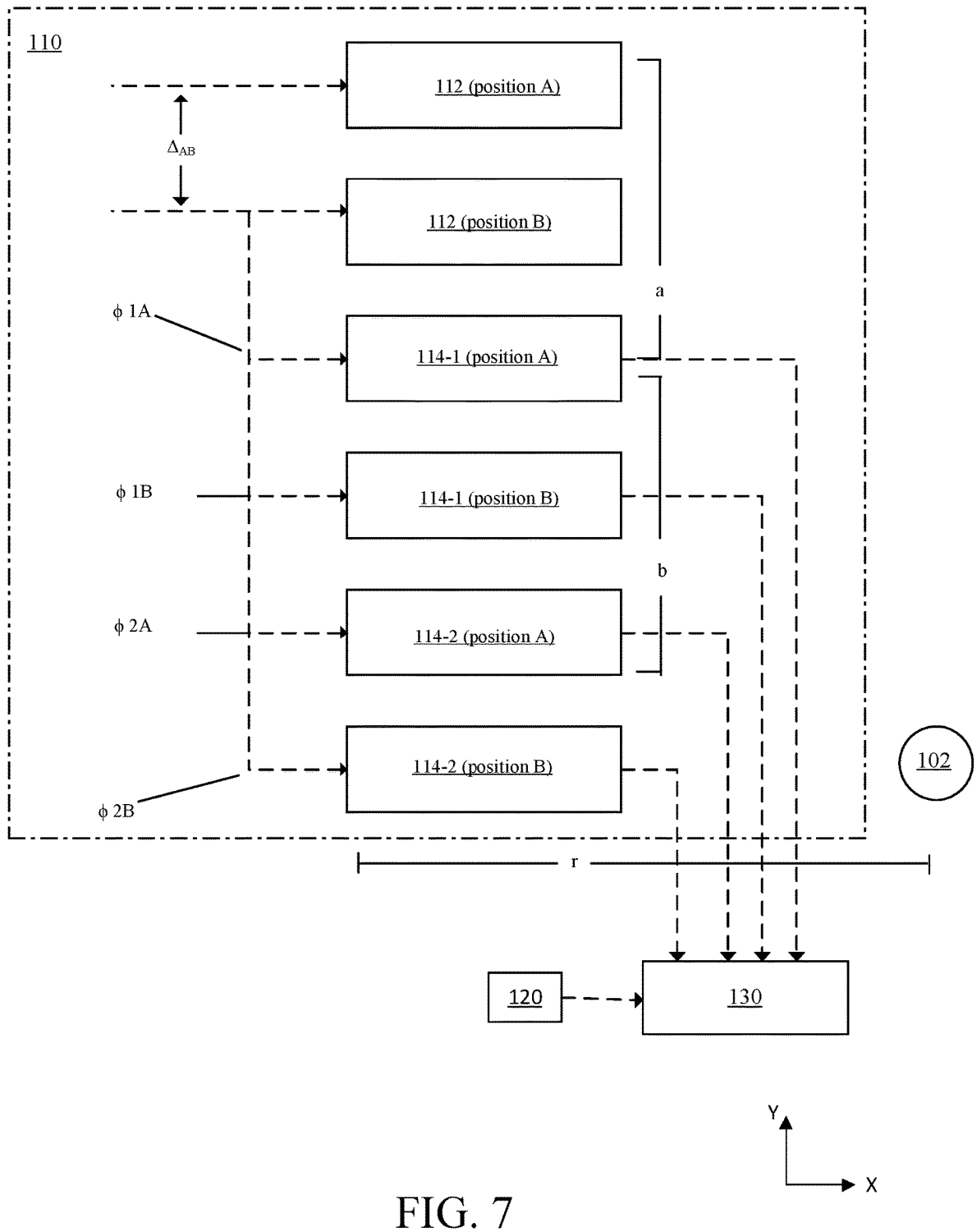
FIG. 7 illustrates a system that can use a plurality of receiving antennas and corresponding phase measurements to sense a spatial disposition of a vehicle, in accordance with some embodiments.

FIG. 7 shows a controller 130 operatively coupled to a vehicle position sensor 120 and a radar antenna array comprising a transmitting antenna 112 and receiving antennas 114-1 and 114-2. The radar antenna array may comprise a plurality of transmitting and/or receiving antennas. In some embodiments, the antenna array may comprise a plurality of receiving antennas. The distance between adjacent transmitting or receiving antennas may be less than one-quarter or greater than ten times the wavelength of a center frequency of the successive radar pulses transmitted by the transmitting antenna. The distance between adjacent transmitting or receiving antennas may range from about one-quarter to about ten times of a wavelength of a center frequency of the successive radar pulses transmitted by the transmitting antenna. The distance between adjacent transmitting or receiving antennas may be at least about 0.25, 0.5, 0.75, 1, 2, 3, 4, 5, 6, 7, 8, 9, or 10 times the wavelength of a center frequency of the successive radar pulses transmitted by the transmitting antenna, or any value in between about 0.25 and 10 times the wavelength of a center frequency of successive radar pulses transmitted by a transmitting antenna. The distance between adjacent transmitting or receiving antennas may be greater than, less than, or approximately equal to 0.5 of the wavelength of a center frequency of the successive radar pulses transmitted by the transmitting antenna. The distance between adjacent transmitting or receiving antennas may be at least about 1 millimeter (mm), 2 mm, 3 mm, 4 mm, 5 mm, 6 mm, 7 mm, 8 mm, 9 mm, 10 mm, 10 centimeters (cm), 100 cm, or 1 meter. Alternatively, the distance between adjacent transmitting or receiving antennas may be at most about 1 millimeter (mm), 2 mm, 3 mm, 4 mm, 5 mm, 6 mm, 7 mm, 8 mm, 9 mm, 10 mm, 10 centimeters (cm), 100 cm, or 1 meter. The distance between adjacent transmitting or receiving antennas may range from about 1 mm to 1 m.

The controller may be used to synchronize measurements taken by the system. The controller may be implemented onboard the terrestrial vehicle or off-site on a server. The controller may comprise a computer processor, application specific integrated circuit, a graphics processing unit, or a field programmable gate array. In some embodiments, the controller may be configured to obtain a first set of measurements from a radar antenna array. The first set of measurements may be based on successive radar pulses transmitted by the transmitting antenna and a plurality of signals received by the receiving antenna. The plurality of signals received by the receiving antenna may include a subset of the successive radar pulses that are transmitted by the transmitting antenna and reflected back to the receiving antenna after interacting with external targets. The controller can also be configured to obtain a second set of measurements from a vehicle position sensor. The second set of measurements may include information on the spatial disposition of a vehicle. The vehicle position sensor may obtain a spatial disposition of a terrestrial vehicle in real time. The terrestrial vehicle may be stationary or in motion. The controller may also be configured to synchronize the first set of measurements with the second set of measurements to generate a set of synchronized measurements. The controller may be further configured to use the synchronized measurements to determine a spatial disposition of a target or a characteristic of a target. In some cases, the plurality of signals received by the receiving antennas may include phase measurements at adjacent receiving antennas for successive locations of a terrestrial vehicle. Phase measurements may be measurements of the difference in phase between a first signal transmitted by the transmitting antenna and a second signal received by a receiving antenna. The second signal may be a subset of the first signal reflected off a target after the first signal interacts with the target. The phase measurements may be associated with the successive radar pulses transmitted by a transmitting antenna. The controller may also be configured to calculate the spatial disposition of a terrestrial vehicle based at least in part on a relationship between the differences between two or more (e.g. 2, 3, 4, 5, 6, 7, 8, 9, or 10) sets of phase measurements at adjacent receiving antennas. The relationship may be given by:

$$\frac{\varphi_{1A} - \varphi_{1B}}{\varphi_{1A} - \varphi_{2A}} = k\frac{x}{b}$$

where $\varphi_{1A}$ is the phase measurement of a signal received by a first receiving antenna in a first position at time A, $\varphi_{1B}$ is the phase measurement of a signal received by a first receiving antenna in a second position at time B, $\varphi_{2A}$ is the phase measurement of a signal received by a second receiving antenna in a third position at time A, k is a proportionality constant dependent on the range distance between a target and the radar, x is the distance between a first position at time A and a second position at time B, and b is the distance between the first receiving antenna in a first position and a second receiving antenna in a third position.

In some embodiments, the phase measurements for some adjacent receiving antennas may correspond to any of the successive radar pulses transmitted by a transmitting antenna. The controller may also be configured to compute an angle of arrival and determine the motion of a terrestrial vehicle. The angle of arrival may be computed based in part on a relationship between the angle of arrival and one or more sets of phase measurements at adjacent receiving antennas. The relationship may be given by:

$$\sin \theta = k(\varphi_{1A} - \varphi_{2A})$$

where θ is the angle of arrival, k is a proportionality constant dependent on the range distance between a target and the radar, $\varphi_{1A}$ is the phase measurement of a signal received by a first receiving antenna in a first position at time A, and $\varphi_{2A}$ is the phase measurement of a signal received by a second receiving antenna in a second position at time A. The motion of a terrestrial vehicle may be determined in a two-dimensional plane with range and azimuth information based in part from the angle of arrival and an additional set of phase measurements for each adjacent receiving antenna. The relationship between the motion of a terrestrial vehicle, the angle of arrival, and phase measurements from adjacent receiving antennas may be given by:

$$\phi_{iA} - \phi_{jB} = k[(\sin \theta \cdot f(b_{ij}, \Delta h, \Delta x) + \cos \theta \cdot g(b_{ij}, \Delta h, \Delta r)]$$

where i and j are antennas in a radar antenna array with dimensions N×N, where N may be any integer greater than or equal to 1, $\phi_{iA}$ is the phase measurement of an antenna i in a first position at time A, $\phi_{jB}$ is the phase measurement of an antenna j in a second position at time B, k is a proportionality constant dependent on the range distance between a target and the radar, θ is the angle of arrival, $b_{ij}$ is the distance between antenna i and antenna j, Δh is the change in heading of a terrestrial vehicle moving from a first position at time A to a second position at time B, Δx is the change in azimuth of a terrestrial vehicle moving from a first position at time A to a second position at time B, Δr is the change in range of a terrestrial vehicle moving from a first position at time A to a second position at time B, f is a function of a first set of distance and angle parameters (e.g., $b_{ij}$, Δh, Δx), and g is a function of a second set of distance and angle parameters (e.g., $b_{ij}$, Δh, Δr). In further embodiments, the controller may also be configured to convert range and azimuth information to a set of Cartesian coordinates based on a set of relationships between Cartesian and spherical coordinate systems. The set of relationships may be given by:

$$x = r \sin \theta \cos \varphi$$

$$y = r \sin \theta \sin \varphi$$

$$z = r \cos \theta$$

where r is the distance between the radar antenna array and the target, θ is the elevation angle, φ is the azimuth angle, and x, y, and z are the Cartesian coordinates representing the motion of the vehicle.

Figure 8:
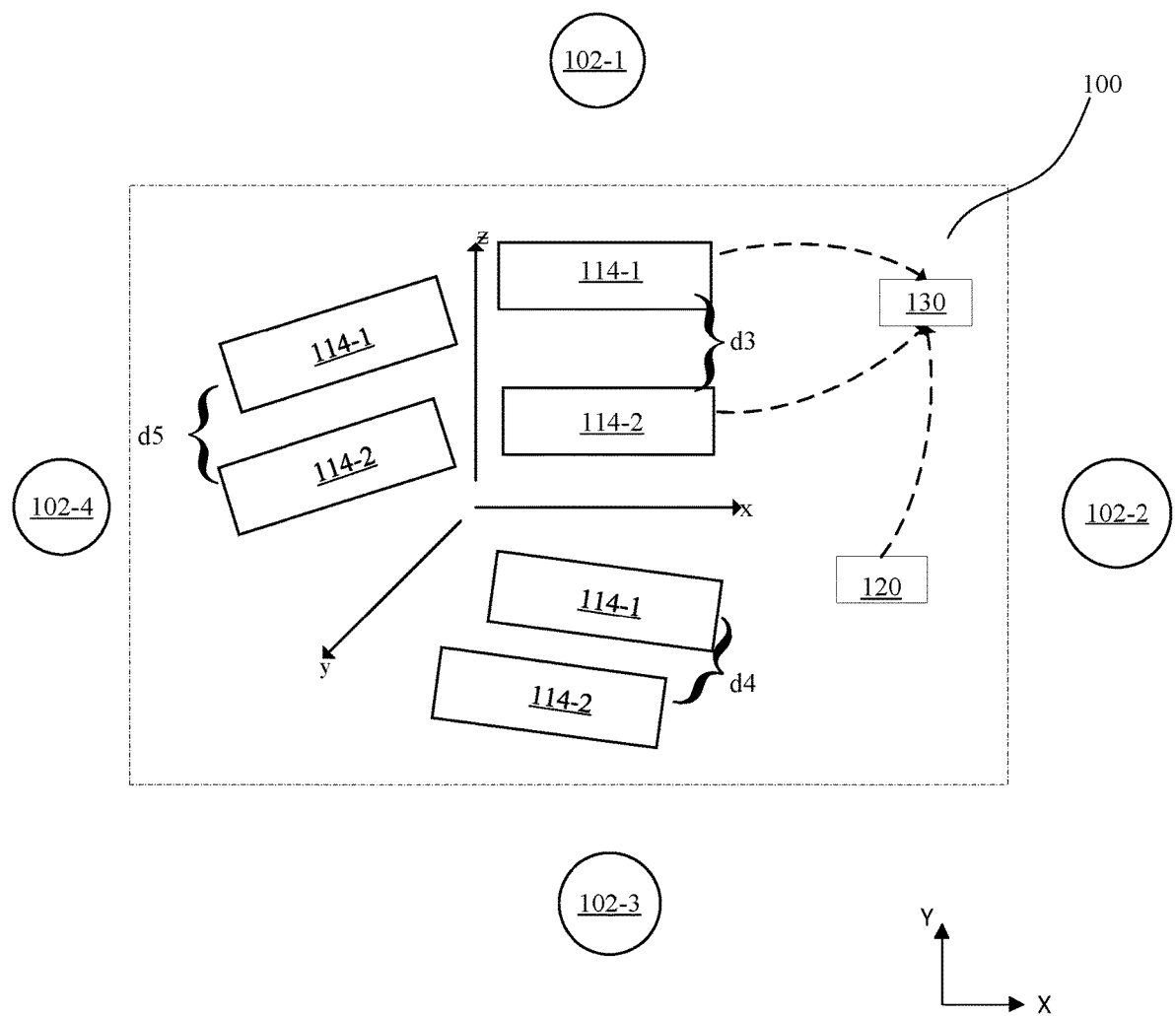
FIG. 8 illustrates a system that may be used on a vehicle to detect a plurality of targets, in accordance with some embodiments.

FIG. 8 shows a system 100 that may be used on a terrestrial vehicle to detect a plurality of targets 102-1, 102-2, 102-3, 102-4. The plurality of targets may be located in different positions in front of, behind, or to the sides of the terrestrial vehicle. The system may comprise a controller operatively coupled to one or more radar antenna arrays and a vehicle position sensor 120. The radar antenna may comprise one or more receiving antennas 114. In some embodiments, the one or more receiving antennas may have a fixed spatial configuration in lateral or vertical planes. The one or more receiving antennas may be fixed in the XY plane, the YZ plane, or the XZ plane. The one or more receiving antennas may be placed in a fixed orientation relative to each other. The one or more receiving antennas may be placed in parallel or perpendicular to each other. The one or more receiving antennas may be placed at a fixed distance d3 relative to each other in the XZ plane, at a fixed distance d4 relative to each other in the XY plane, and/or at a fixed distance d5 relative to each other in the YZ plane. The distance between the one or more adjacent receiving antennas may be at least about 1 millimeter (mm), 2 mm, 3 mm, 4 mm, 5 mm, 6 mm, 7 mm, 8 mm, 9 mm, 10 mm, 10 centimeters (cm), 100 cm, 1 meter (m), 5 m, or more. In some example, the distance between the one or more adjacent receiving antennas may range from about 1 millimeter (mm) to 1 meter (m).

The controller may be used to synchronize measurements taken by the system. The controller may be implemented onboard the terrestrial vehicle or off-site on a server. The controller may comprise a computer processor, application specific integrated circuit, a graphics processing unit, or a field programmable gate array. In some embodiments, the controller may be configured to obtain a first set of measurements from a radar antenna array. The first set of measurements may be based on successive radar pulses transmitted by the transmitting antenna and a plurality of signals received by the receiving antenna. The plurality of signals received by the receiving antenna may include a subset of the successive radar pulses that are transmitted by the transmitting antenna and reflected back to the receiving antenna after interacting with external targets. The controller can also be configured to obtain a second set of measurements from a vehicle position sensor. The second set of measurements may include information on the spatial disposition of a vehicle. The vehicle position sensor may obtain a spatial disposition of a terrestrial vehicle in real time. The terrestrial vehicle may be stationary or in motion. The controller may also be configured to synchronize the first set of measurements with the second set of measurements to generate a set of synchronized measurements. The controller may be further configured to use the synchronized measurements to determine a spatial disposition of a target or a characteristic of a target. In some embodiments, the controller can also be configured to calculate the spatial disposition or characteristic of each of a plurality of targets based at least in part on the fixed spatial configuration of the receiving antennas.

Figure 9A:
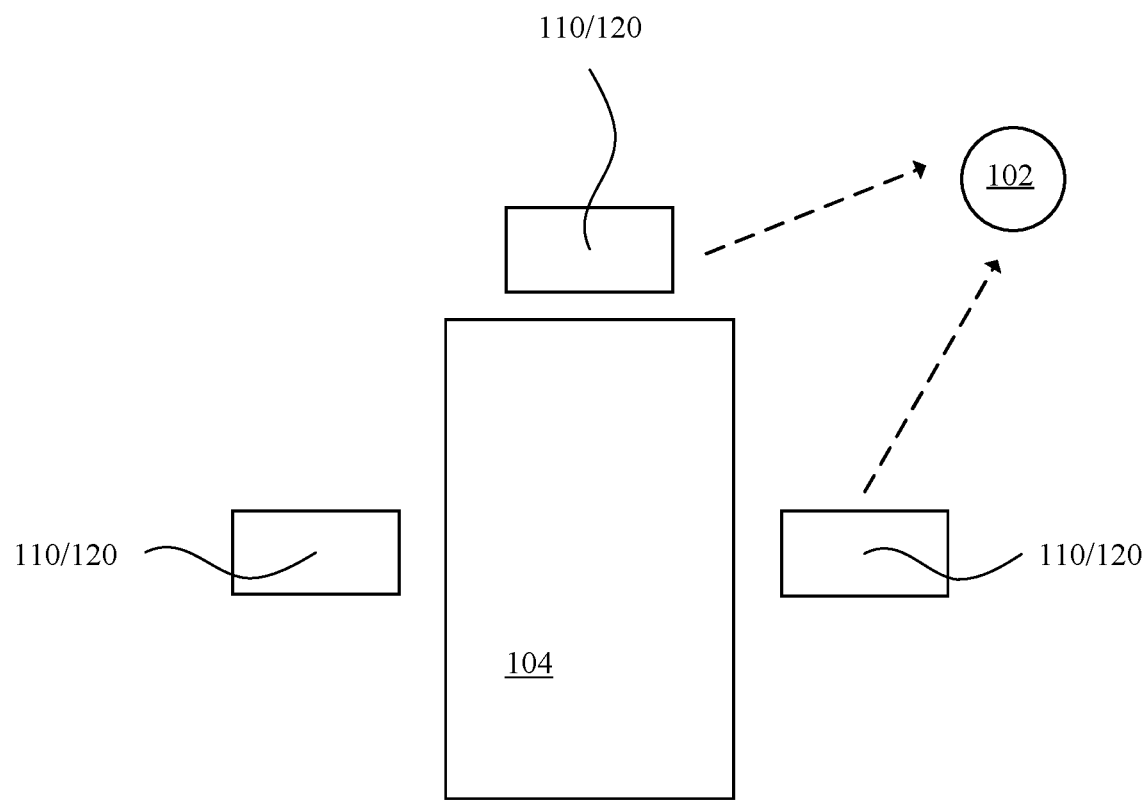
FIG. 9A illustrates a system that may be used on a vehicle to detect a target in a surrounding environment using one or more radar antenna arrays or vehicle position sensors, in accordance with some embodiments.

FIG. 9A shows some a system that may be used on a vehicle 104 to detect a target 102 in a surrounding environment using one or more radar antenna arrays 110 or vehicle position sensors 120. The vehicle may have more than one radar antenna array or vehicle position sensor located on the front, rear, sides, top, or bottom of the vehicle. A controller may be configured to synchronize measurements taken from one or more radar antenna arrays and one or more vehicle position sensors to determine the characteristic or spatial disposition of a target external to a vehicle.

Figure 9B:
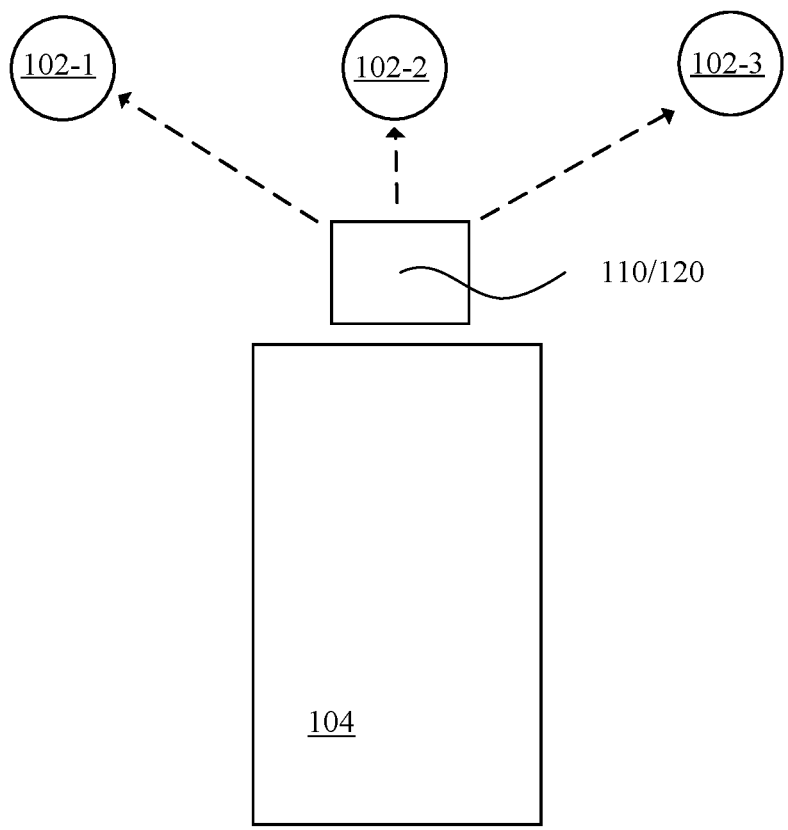
FIG. 9B illustrates a system that may be used on a vehicle to detect one or more targets in a surrounding environment using a radar antenna array or a vehicle position sensor, in accordance with some embodiments.

FIG. 9B shows some a system that may be used on a vehicle 104 to detect one or more targets 102-1, 102-3, 102-3 in a surrounding environment using a radar antenna array 110 or a vehicle position sensor 120. The radar antenna array or vehicle position sensor may be located on the front, rear, sides, top, or bottom of the terrestrial vehicle. A controller may be configured to synchronize one or more measurements taken from a radar antenna array or vehicle position sensor to determine the characteristic or spatial disposition of a plurality of targets external to a terrestrial vehicle. The targets may be located on different sides of the vehicle and may be at a distance of at least about 1.0 meter (m), 2.0 m, 3.0 m, 4.0 m, 5.0 m, 10 m, 15 m, 20 m, 25 m, 50 m, 75 m, or 100 m from the vehicle.

Figure 9C:
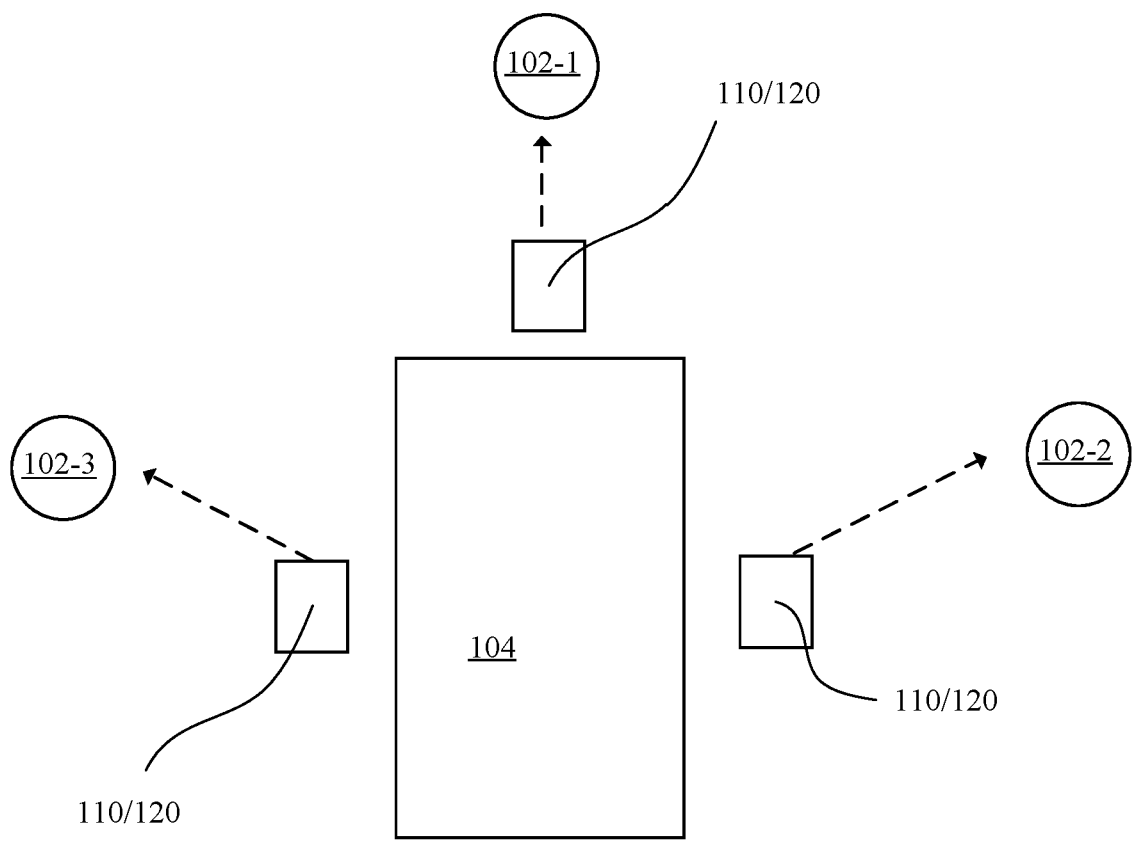
FIG. 9C illustrates a system that may be used on a vehicle to detect one or more target in a surrounding environment using one or more radar antenna arrays or vehicle position sensors, in accordance with some embodiments.

FIG. 9C shows some a system that may be used on a vehicle 104 to detect one or more targets 102-1, 102-2, 102-3 in a surrounding environment using one or more radar antenna arrays or vehicle position sensors. The vehicle may have one or more radar antenna arrays 110 or vehicle position sensors 120 located on the front, rear, sides, top, or bottom of the terrestrial vehicle. A controller may be configured to synchronize measurements taken from one or more radar antenna arrays and one or more vehicle position sensors to determine the characteristic or spatial disposition of a plurality of targets external to a terrestrial vehicle. The targets may be located on different sides of the vehicle and may be at a distance of at least about 1.0 meter (m), 2.0 m, 3.0 m, 4.0 m, 5.0 m, 10 m, 15 m, 20 m, 25 m, 50 m, 75 m, or 100 m from the vehicle.

In any of the embodiments described herein, the system may comprise a synthetic aperture radar system. The synthetic aperture radar system may be used to collect or receive a subset of the successive radar pulses that are transmitted by the transmitting antenna and reflected back to the receiving antenna after interacting with external targets. The subset of successive radar pulses collected or received may be used to determine a characteristic or spatial disposition of a target relative to a terrestrial vehicle. The synthetic aperture radar may be located onboard a terrestrial vehicle, on the front, rear, sides, top, or bottom of the terrestrial vehicle.

The synthetic aperture radar may have an azimuth resolution less than about 0.05° or an azimuth resolution greater than about 1°. The synthetic aperture radar may have an azimuth resolution that is about 0.05°, 0.06°, 0.07°, 0.08°, 0.09°, or 1°, or any value in between 0.05° and 1°.

The synthetic aperture radar may have an elevation resolution less than about 2.5° or an elevation resolution greater than about 10°. The synthetic aperture radar may have an elevation resolution that is about 2.5°, 3.0°, 3.5°, 4.0°, 4.5°, 5.0°, 5.5°, 6.0°, 6.5°, 7.0°, 7.5°, 8.0°, 8.5°, 9.0°, 9.5°, or 10°, or any value in between 2.5° and 10°.

The synthetic aperture radar may have an elevation resolution less than about 5° or an elevation resolution greater than about 30°. The synthetic aperture radar may have an elevation resolution that is about 5°, 10°, 15°, 20°, 25°, or 30°, or any value in between 5° and 30°.

In any of the embodiments described herein, the spatial disposition or characteristic of a target external to a terrestrial vehicle may be determined by using a controller operatively coupled to a radar antenna array and a vehicle position sensor. One or more radar antenna arrays may be located on a terrestrial vehicle, on the front, rear, sides, top, or bottom of the terrestrial vehicle. The radar antenna array may include a transmitting antenna and a receiving antenna. The transmitting antenna and the receiving antenna may be in a fixed spatial configuration on the vehicle. The fixed spatial configuration may be the same or similar to other embodiments described herein. The vehicle position sensor may include a GPS, IMU, etc. The vehicle position sensor may be used to obtain a spatial disposition of a terrestrial vehicle. The controller may be configured to synchronize successive radar pulses transmitted by a transmitting antenna and a plurality of signals received by a receiving antenna with the spatial disposition obtained from the vehicle position sensor to generate a set of synchronized measurements. The controller may be further configured to use the synchronized measurements to determine a characteristic or spatial disposition of a target relative to a terrestrial vehicle. The plurality of signals received by the receiving antenna may include a subset of the successive radar pulses that are transmitted by the transmitting antenna and reflected back to the receiving antenna after interacting with external targets. The synchronized measurements may be generated based at least in part based on a fixed spatial configuration of a transmitting antenna and a receiving antenna. In some embodiments, the characteristic or spatial disposition of a target relative to a terrestrial vehicle may be determined substantially in real time. The terrestrial vehicle may be stationary or moving relative to a target. A target may be stationary or in motion. In some embodiments, the controller may be configured to process a first spatial disposition of a target against a second spatial disposition of the target. The first spatial disposition may be calculated from a first side of a terrestrial vehicle or using a first radar antenna array. The second spatial disposition may be calculated from a second side of a terrestrial vehicle or using a second radar antenna array.

In any one or more of the embodiments described herein, the system may comprise a multiple-input-multiple-output (MIMO) radar system. A MIMO radar system may use multiple transmitting antennas to transmit a signal independently of other transmitting antennas. In another embodiment, the system may comprise a Synthetic Aperture Radar (SAR) system that comprises one or more vehicle position sensors.

Figure 10:
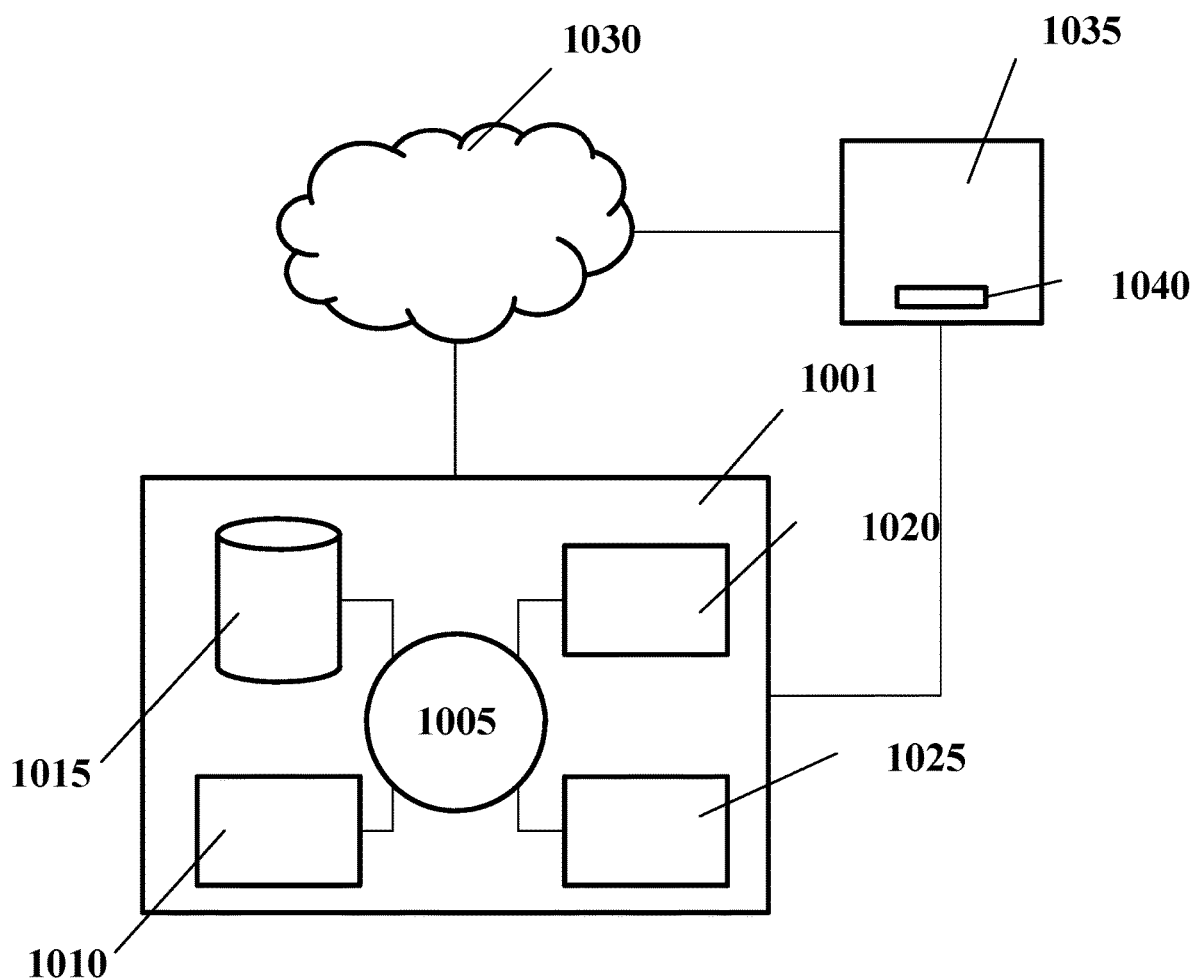
FIG. 10 illustrates a computer control system that is programmed or otherwise configured to implement methods provided herein.

Computer control systems are provided herein that can be used to implement methods or systems of the disclosure. FIG. 10 shows a computer system 1001 that is programmed or otherwise configured to implement a method for detecting a spatial disposition or characteristic of one or more targets external to a vehicle. The computer system 1001 can synchronize measurements taken from one or more radar antenna arrays and one or more vehicle position sensors to detect a spatial disposition or characteristic of one or more targets external to a vehicle. The computer system 1001 can be an electronic device of a user or a computer system that is remotely located with respect to the electronic device. The electronic device can be a mobile electronic device.

The computer system 1001 includes a central processing unit (CPU, also "processor" and "computer processor" herein) 1005, which can be a single core or multi core processor, or a plurality of processors for parallel processing. The computer system 1001 also includes memory or memory location 1010 (e.g., random-access memory, read-only memory, flash memory), electronic storage unit 1015 (e.g., hard disk), communication interface 1020 (e.g., network adapter) for communicating with one or more other systems, and peripheral devices 1025, such as cache, other memory, data storage and/or electronic display adapters. The memory 1010, storage unit 1015, interface 1020 and peripheral devices 1025 are in communication with the CPU 1005 through a communication bus (solid lines), such as a motherboard. The storage unit 1015 can be a data storage unit (or data repository) for storing data. The computer system 1001 can be operatively coupled to a computer network ("network") 1030 with the aid of the communication interface 1020. The network 1030 can be the Internet, an internet and/or extranet, or an intranet and/or extranet that is in communication with the Internet. The network 1030 in some cases is a telecommunication and/or data network. The network 1030 can include one or more computer servers, which can enable distributed computing, such as cloud computing. The network 1030, in some cases with the aid of the computer system 1001, can implement a peer-to-peer network, which may enable devices coupled to the computer system 1001 to behave as a client or a server.

The CPU 1005 can execute a sequence of machine-readable instructions, which can be embodied in a program or software. The instructions may be stored in a memory location, such as the memory 1010. The instructions can be directed to the CPU 1005, which can subsequently program or otherwise configure the CPU 1005 to implement methods of the present disclosure. Examples of operations performed by the CPU 1005 can include fetch, decode, execute, and writeback.

The CPU 1005 can be part of a circuit, such as an integrated circuit. One or more other components of the system 1001 can be included in the circuit. In some cases, the circuit is an application specific integrated circuit (ASIC).

The storage unit 1015 can store files, such as drivers, libraries and saved programs. The storage unit 1015 can store user data, e.g., user preferences and user programs. The computer system 1001 in some cases can include one or more additional data storage units that are external to the computer system 1001, such as located on a remote server that is in communication with the computer system 1001 through an intranet or the Internet.

The computer system 1001 can communicate with one or more remote computer systems through the network 1030. For instance, the computer system 1001 can communicate with a remote computer system of a user (e.g., an end user, a consumer, a publisher, a vehicle operator, etc.). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 1001 via the network 1030.

Methods as described herein can be implemented by way of machine (e.g., computer processor) executable code stored on an electronic storage location of the computer system 1001, such as, for example, on the memory 1010 or electronic storage unit 1015. The machine executable or machine readable code can be provided in the form of software. During use, the code can be executed by the processor 1005. In some cases, the code can be retrieved from the storage unit 1015 and stored on the memory 1010 for ready access by the processor 1005. In some situations, the electronic storage unit 1015 can be precluded, and machine-executable instructions are stored on memory 1010.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 1001, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1001 can include or be in communication with an electronic display 1035 that comprises a user interface (UI) 1040 for providing, for example, a portal for monitoring one or more targets detected by the system. A user can use the portal to view information relating to the spatial disposition or characteristics of one or more targets detected by the system. The portal may be provided through an application programming interface (API). A user or entity can also interact with various elements in the portal via the UI. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 1005. The algorithm may be configured to obtain a first set of measurements from one or more radar antenna arrays. The first set of measurements may be based on successive radar pulses transmitted by a transmitting antenna and a plurality of signals received by a receiving antenna. The plurality of signals received by the receiving antenna may include a subset of the successive radar pulses that are transmitted by the transmitting antenna and reflected back to the receiving antenna after interacting with one or more external targets. The algorithm may also be configured to obtain a second set of measurements from a vehicle position sensor. The second set of measurements may include information on the spatial disposition of a vehicle. The vehicle position sensor may obtain a spatial disposition of a terrestrial vehicle in real time. The terrestrial vehicle may be stationary or in motion. The algorithm can be configured to synchronize the first set of measurements with the second set of measurements to generate a set of synchronized measurements. The algorithm may be configured to generate one or more sets of synchronized measurements using a real time clock, a system clock, a common clock, or an independent clock. The algorithm may be configured to generate one or more sets of synchronized measurements using phase measurements at one or more transmitting or receiving antennas. The algorithm can be further configured to use the synchronized measurements to determine a spatial disposition or characteristic of one or more targets external to a vehicle.

While preferred embodiments have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for radar imaging, comprising:
   (a) using a plurality of radar antenna arrays provided on a terrestrial vehicle to obtain phase measurements associated with one or more radar signals transmitted and received by said plurality of radar antenna arrays as said terrestrial vehicle moves through an environment;
   (b) using a vehicle position sensor comprising an inertial measurement unit, a Global Positioning Sensor (GPS), a camera, a lidar, a radar, or a wheel encoder to obtain vehicle motion information substantially in real time;
   (c) synchronizing said phase measurements and said vehicle motion information using one or more clocks that are common to said plurality of radar antenna arrays and said vehicle position sensor and a plurality of timestamps calculated based on the one or more clocks, wherein each of said plurality of radar antenna arrays and said vehicle position sensor is configured to:
   determine, relative to said one or more clocks, a timestamp of the plurality of timestamps that is associated with a sample,
   derive a sampling frequency as a multiple of said one or more clocks, and
   determine a relative timing based on said sampling frequency;
   (d) processing said phase measurements to compute (i) a set of object-specific properties for one or more objects external to said terrestrial vehicle and (ii) a set of vehicle-specific properties for said terrestrial vehicle, wherein said one or more objects are classified based at least in part on (i) said vehicle motion information and (ii) one or more phase differences associated with said one or more radar signals; and
   (e) using said set of object-specific properties and said set of vehicle-specific properties to generate one or more radar images of said environment as said terrestrial vehicle moves through said environment.

2. The method of claim 1, wherein said set of object-specific properties and said set of vehicle-specific properties are computed based at least in part on said one or more phase differences associated with said one or more radar signals transmitted and received by said plurality of radar antenna arrays.

3. The method of claim 1, wherein said set of object-specific properties and said set of vehicle-specific properties are computed based at least in part on said vehicle motion information associated with said terrestrial vehicle.

4. The method of claim 2, wherein processing said phase measurements further comprises computing one or more kinematic relationships between said terrestrial vehicle and said one or more objects based at least in part on (i) said set of object-specific properties and (ii) said set of vehicle-specific properties.

5. The method of claim 4, wherein said one or more radar images of said environment are updated based at least in part on said one or more kinematic relationships.

6. The method of claim 4, wherein said one or more kinematic relationships comprise a relative position, a relative orientation, a relative translation, a relative rotation, a relative velocity, or a relative acceleration of said one or more objects in relation to said terrestrial vehicle.

7. The method of claim 4, wherein said one or more kinematic relationships are computed in part using an angle of arrival associated with said one or more radar signals transmitted and received by said plurality of radar antenna arrays.

8. The method of claim 4, wherein said one or more kinematic relationships are computed in part using a Doppler velocity associated with said one or more radar signals.

9. The method of claim 1, wherein said phase measurements are obtained substantially in real time while said terrestrial vehicle is moving through said environment.

10. The method of claim 1, further comprising: updating said one or more radar images based on at least one of (i) said one or more phase differences associated with said one or more radar signals and (ii) vehicle motion information associated with said terrestrial vehicle.

11. The method of claim 1, further comprising: tracking at least one of said one or more objects across a plurality of successive radar images, wherein said plurality of successive radar images are generated as said terrestrial vehicle moves through said environment.

12. The method of claim 1, wherein said set of object-specific properties comprises at least one of a physical property or a kinematic property of said one or more objects.

13. The method of claim 12, wherein said physical property comprises a size, a shape, a material type, or a reflectance of said one or more objects.

14. The method of claim 12, wherein said kinematic property comprises a position, an orientation, a velocity, or an acceleration of said one or more objects.

15. The method of claim 1, wherein said set of vehicle-specific properties comprises a kinematic property of said terrestrial vehicle.

16. The method of claim 15, wherein said kinematic property comprises a position, an orientation, a velocity, or an acceleration of said terrestrial vehicle.

17. The method of claim 1, wherein each radar antenna array of said plurality of radar antenna arrays comprises a plurality of transmitting antennas and a plurality of receiving antennas having a predefined spatial configuration.

18. The method of claim 17, wherein said one or more kinematic relationships are computed based at least in part on said predefined spatial configuration.

19. The method of claim 1, further comprising: determining a drivable area in said environment for said terrestrial vehicle to avoid said one or more objects, wherein said drivable area is determined based at least in part on said one or more radar images.

20. The method of claim 19, wherein said drivable area is determined substantially in real time as said terrestrial vehicle moves through said environment.

21. The method of claim 19, further comprising: updating said drivable area based at least in part on a plurality of successive radar images generated as said terrestrial vehicle moves through said environment.

22. The method of claim 1, wherein said vehicle motion information is synchronized with said one or more radar signals based on said one or more phase differences.

* * * * *